(12) United States Patent
Faulkner et al.

(10) Patent No.: US 10,237,496 B2
(45) Date of Patent: *Mar. 19, 2019

(54) GRAPHICAL TRANSITIONS OF DISPLAYED CONTENT BASED ON A CHANGE OF STATE IN A TELECONFERENCE SESSION

(71) Applicant: Microsoft Technology Licensing, LLC, Redmond, WA (US)

(72) Inventors: Jason Thomas Faulkner, Seattle, WA (US); Casey Baker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,535

(22) Filed: Nov. 13, 2017

(65) Prior Publication Data
US 2018/0191965 A1   Jul. 5, 2018

Related U.S. Application Data

(63) Continuation of application No. 15/396,218, filed on Dec. 30, 2016, now Pat. No. 9,819,877.

(51) Int. Cl.
*H04N 7/15*  (2006.01)
*H04N 5/262*  (2006.01)
(Continued)

(52) U.S. Cl.
CPC ....... *H04N 5/2628* (2013.01); *H04L 65/1089* (2013.01); *H04L 65/1093* (2013.01); *H04L 65/403* (2013.01); *H04N 5/44591* (2013.01); *H04N 7/147* (2013.01); *H04N 7/152* (2013.01); *H04N 7/157* (2013.01)

(58) Field of Classification Search
CPC .. H04N 5/2628; H04N 7/157; H04N 5/44591; H04L 65/1093; H04L 65/1089
See application file for complete search history.

(56) References Cited

U.S. PATENT DOCUMENTS

| 5,960,173 A | 9/1999 | Tang et al. |
| 6,473,114 B1 | 10/2002 | Strubbe |

(Continued)

OTHER PUBLICATIONS

"Non Final Office Action Issued in U.S. Appl. No. 15/396,218", dated Apr. 4, 2017, 10 Pages.

(Continued)

*Primary Examiner* — Stella L. Woo
(74) *Attorney, Agent, or Firm* — Newport IP, LLC; Scott Y. Shigeta

(57) ABSTRACT

A system configured to host a teleconference session is disclosed. The system hosts a teleconference session between a plurality of client computing devices. The system provides transitions of displayed content between various positions of a user interface that displays a teleconference stream. The transitions can occur in response to an event that changes a state of the teleconference session, where the state of the teleconference session can be associated with a total number of users participating in the teleconference session. Accordingly, in various examples described herein, a change in state of the teleconference session can be attributed to an event in which a user joins the teleconference session or an event in which a user leaves the teleconference session.

22 Claims, 19 Drawing Sheets

(51) Int. Cl.
*H04L 29/06* (2006.01)
*H04N 5/445* (2011.01)
*H04N 7/14* (2006.01)

(56) References Cited

U.S. PATENT DOCUMENTS

| | | |
|---|---|---|
| 8,904,296 B2 | 12/2014 | Sahai et al. |
| 9,026,935 B1 | 5/2015 | Rasmussen et al. |
| 9,171,286 B2 | 10/2015 | Bhogal et al. |
| 9,819,877 B1* | 11/2017 | Faulkner ............. H04N 5/2628 |
| 2002/0178019 A1 | 11/2002 | Anderson et al. |
| 2005/0022236 A1* | 1/2005 | Ito ............................ H04H 60/63 |
| | | 725/39 |
| 2005/0099492 A1 | 5/2005 | Orr |
| 2008/0120381 A1 | 5/2008 | Awan et al. |
| 2010/0073454 A1* | 3/2010 | Lovhaugen ........... G06F 3/0486 |
| | | 348/14.03 |
| 2010/0169796 A1 | 7/2010 | Lynk et al. |
| 2010/0223345 A1 | 9/2010 | Gupta et al. |
| 2011/0271204 A1 | 11/2011 | Jones et al. |
| 2012/0127262 A1* | 5/2012 | Wu ........................... H04N 7/152 |
| | | 348/14.09 |
| 2012/0182381 A1 | 7/2012 | Abate et al. |
| 2013/0090045 A1 | 4/2013 | Meyer |
| 2013/0342634 A1 | 12/2013 | Zhang |
| 2014/0063177 A1* | 3/2014 | Tian ........................ H04N 7/15 |
| | | 348/14.07 |
| 2014/0160224 A1 | 6/2014 | Herger et al. |
| 2015/0092011 A1* | 4/2015 | Zhan ........................ H04N 7/15 |
| | | 348/14.08 |
| 2015/0304366 A1 | 10/2015 | Bader-natal et al. |
| 2016/0072862 A1 | 3/2016 | Bader-natal et al. |
| 2016/0308920 A1* | 10/2016 | Brunsch ................ H04L 65/403 |

OTHER PUBLICATIONS

"Notice of Allowance Issued in U.S. Appl. No. 15/396,218", dated Jul. 10, 2017, 5 Pages.

"Hangouts", https://gsuite.google.co.in/intl/en_in/products/hangouts/, Published on: Sep. 30, 2016, 3 pages.

"GoToMeeting", https://www.gotomeeting.com/features, Published on: Oct. 16, 2015, 6 pages.

"Start a Skype for Business conference call", https://support.office.com/en-us/article/Start-a-Skype-for-Business-conference-call-8dc8ac52-91ac-4db9-8672-11551fdaf997, Published on: Sep. 7, 2015, 3 pages.

* cited by examiner

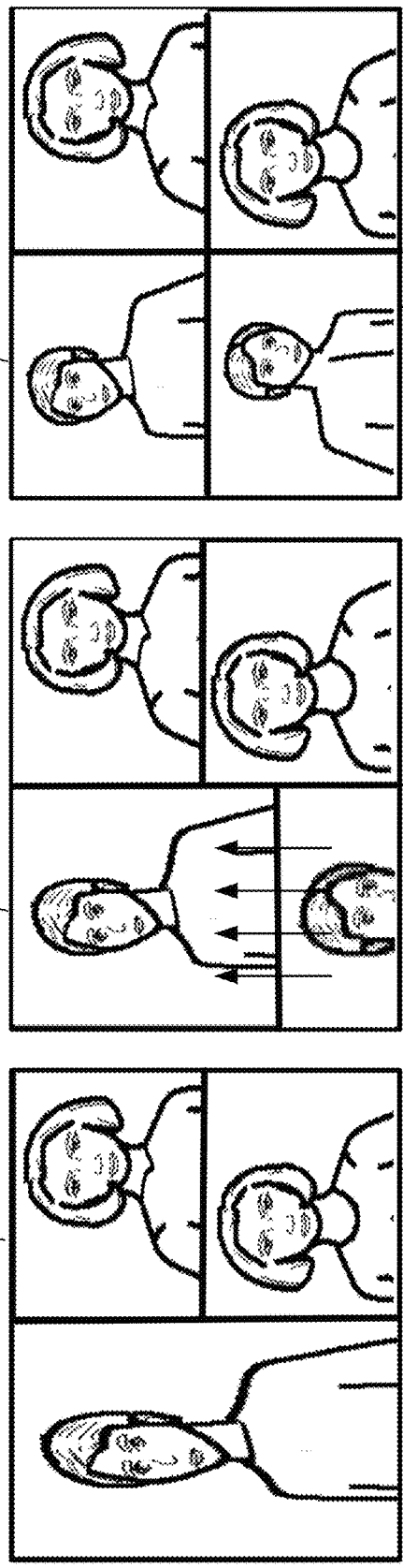

First Grid Cell In The Second Position
1104

Transition From Four Other Participants To Three Other Participants
1100

Remove Fourth Grid Cell In Seventh Position
1102

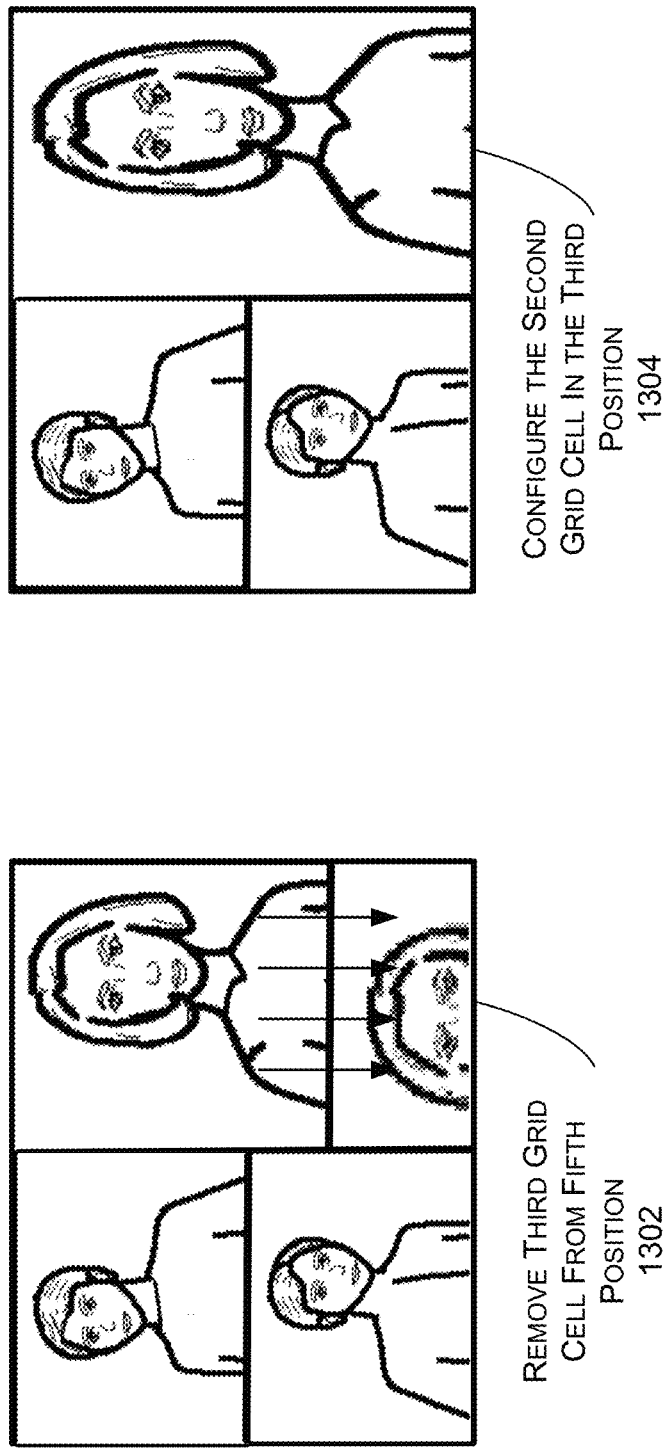

Transitions From Three Other Participants to Two Other Participants 1500

Transitions From Three Other Participants to Two Other Participants
1600

TRANSITIONS FROM TWO OTHER PARTICIPANTS TO ONE OTHER PARTICIPANT 1700

GRAPHICAL TRANSITIONS OF DISPLAYED CONTENT BASED ON A CHANGE OF STATE IN A TELECONFERENCE SESSION

PRIORITY APPLICATION

This application is a continuation of, and claims priority to, U.S. patent application Ser. No. 15/396,218, filed Dec. 30, 2016, entitled "Graphical Transitions of Displayed Content based on a Change of State in a Teleconference Session," the entirety of which is herein incorporated by reference.

BACKGROUND

At present, the use of teleconference (e.g., videoconference) systems in personal and commercial settings has increased dramatically so that meetings between people in remote locations can be facilitated. In general, teleconference systems allow users, in two or more remote locations, to communicate interactively with each other via live, simultaneous two-way video streams, audio streams, or both. Some teleconference systems (e.g., CISCO WEBEX provided by CISCO SYSTEMS, Inc. of San Jose, Calif., GOTO MEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE provided by the MICROSOFT CORPORATION, of Redmond, Wash.) also allow users to exchange digital documents or shared virtual locations such as, for example, images, text, video, applications, online locations, social media and any others.

Teleconference systems enable a user to participate in a teleconference session by observing (e.g., viewing) the interactions and behaviors of the meeting through a user interface (e.g., a "window") on a display screen. However, it is often difficult for the user to follow transitions of content being displayed in the user interface when an event that changes the state of the teleconference session occurs. Stated another way, it is difficult for the user to visually understand some state changing actions that occur in the teleconference session. As an example, the state of the teleconference session can include a total number of users participating in the teleconference session. Consequently, it can be difficult for a user to follow who has joined and/or who has left a teleconference session.

SUMMARY

The disclosed system addresses the problems described above with regards to a teleconference session. Specifically, the disclosed system provides transitions of displayed content between various positions of a user interface. The transitions can occur in response to an event that changes a state of the teleconference session, where the state of the teleconference session can be associated with a total number of users participating in the teleconference session. Accordingly, in various examples described herein, a change in state of the teleconference session can be attributed to an event in which a user joins the teleconference session or an event in which a user leaves the teleconference session.

In examples described herein, the transitions comprise guided and coordinated movement of the displayed content between the positions so that a user (e.g., a viewer of the displayed content) can be provided with an awareness of what is happening in a teleconference session. Moreover, the transitions (e.g., movement between positions) are configured to limit the overall amount of movement in the user interface so that the ongoing session experience is not interrupted and so that the user viewing a display screen can maintain focus on the ongoing activity (e.g., people already in the teleconference session that are currently speaking). That is, the transitions limit the amount of "graphical" distraction to the user viewing the display screen. Further, the transitions can be persistent such that the transitions are consistently applied across multiple teleconference sessions in the same or similar manner so the user becomes familiar with the sequence of transitions as users join the teleconference session, for example. For instance, displayed content associated with a user can be moved (e.g., transitioned) in a seamless manner from one predefined position to another predefined position to create display space for another user that has recently joined the teleconference session. The predefined position can be based on a number of participants that have joined the teleconference session. Consequently, a sequence of transitions implemented when users join a teleconference stream can reflect a pattern that guides a viewer in a recognizable and an intuitive way.

Client computing devices participating in a teleconference session are configured to receive and render for display, on a user interface of a display screen, a teleconference stream. The teleconference stream can comprise a collection of various instances of content. For example, an individual instance of content can comprise media data associated with a live video feed (e.g., audio and visual data that capture the appearance and speech of user participating in the teleconference session). Another example of an individual instance of content can comprise media data that includes an avatar of a user participating in the teleconference session along with audio data that captures the speech of a user. Yet another example of an individual instance of content can comprise media data that includes digital content displayed on a display screen of a user along with audio data that captures the speech of a user. The digital content can include, for example, a document, a spreadsheet, presentation slides, an image, a video, etc. Accordingly, the various instances of content within a teleconference stream enable a remote meeting to be facilitated between a group of people and the sharing of content within the group of people.

The teleconference stream can be displayed in a user interface on a display screen. In various examples, the user interface that displays the teleconference stream can include a primary section (e.g., which may also be referred to as the "active stage" and/or the main "canvas") and/or a secondary section (e.g., which may also be referred to as the "passive stage"). The primary section is configured to display instances of content up to a maximum threshold number (e.g., a predetermined maximum number of users). In some implementations, the instances of content displayed in the primary section are associated with users or participating devices that join the teleconference session the earliest (e.g., the first four other participants to join, in order, a viewing participant in a teleconference session). In additional or alternative implementations, the instances of content displayed in the primary section are more relevant to the teleconference session than those displayed in the secondary section. For example, the primary section can display an instance of content associated with a host user of the teleconference session (e.g., a main presenter in the meeting). In another example, the primary section can display instances of content associated with users who contribute more activity to the teleconference session (e.g., users who speak more often for others to listen to).

In some implementations, the secondary section is configured to display instances of content that do not fit within the primary section. Stated another way, the secondary section displays instances of content once the primary section is determined to be full and unable to accommodate any additional instances of content due to a predetermined "primary section" configuration (e.g., the maximum threshold number of instances of content are already being displayed in the primary section). Due to the content relevancy of the primary section compared to the secondary section, the primary section can be displayed in a manner that dominates the user interface on the display screen of a client computing device. That is, the primary section is often larger than the secondary section in the terms of display area.

The primary section comprises individual cells and, as described above, is configured to display a maximum threshold number of individual instances of content which corresponds to a maximum threshold number of cells (e.g., four in many of the examples described herein). An individual cell comprises a display area within the user interface that contains an individual instance of content of the teleconference stream. In various examples described herein, the cells are referred to as "grid" cells and the display area comprises a square or a rectangle. In a more specific example when the primary section is full, four grid cells can be arranged in quadrants (e.g., the user interface is divided into four equally sized squares). In other examples, the cells can be rounded cells and the display area can be a circle or an oval. In some implementations, cells can be offset from one another in a vertical direction and/or a horizontal direction and/or cells can vary in size (e.g., cells can have different height and/or width dimensions).

The systems and techniques described herein are configured to populate individual cells with individual instances of content as users join the teleconference session. Moreover, as users join the teleconference session, an individual cell is transitioned (e.g., moved) from one predefined position to another predefined position to make room (e.g. create display space) for a new, incoming cell containing a new instance of content (e.g., a live video feed of the user who recently joined the teleconference session). In some instances, the systems and techniques can be configured to adjust a level of opacity of an individual cell to bring focus to an active participant (e.g., a participant who is currently speaking, or a participant that is speaking more than other participants displayed in the primary section).

In some implementations, the secondary section may be an overlay to the primary section (e.g., to maximize display space for the primary section). In these implementations, the systems and techniques can be configured to adjust a level of opacity of the secondary section.

Additionally or alternatively, as users leave the teleconference session, an individual cell is also transitioned (e.g., moved) from one predefined position to another to consume the display area vacated by the removal of a cell and an individual instance of content (e.g., the live video feed of the user who recently left). Accordingly, at any given time, the number of cells displayed in the primary section of the user interface corresponds to the number of "other" users (e.g., not including the viewing user) participating in the teleconference session up to a maximum threshold number of cells that the primary section is configured to accommodate.

Once the maximum threshold number is reached (e.g., the primary section is full and is unable to accommodate any more cells), individual instances of content associated with additional users that join the teleconference session are displayed in positions of the secondary section. As individual instances of content are added to the secondary section, transitions (e.g., guided movements) can be implemented so that the positions of the instances of content initially represent an order in which participants join the teleconference session. In some examples, an individual instance of content in a position of the secondary section can be switched (e.g., swapped) with an individual instance of content in a cell in the primary section. The switch can occur in response to a determination that a monitored level of activity of the individual instance of content in the secondary section exceeds a monitored level of activity of the individual instance of content in the primary section. Further, in some implementations, the individual instance of content in the secondary section can change from an avatar to a live video feed based on the switch while the individual instance of content in the primary section can change from a live video feed to an avatar.

In additional examples described herein, a transition can comprise a graphical alteration to an individual instance of content without the individual instance of content changing positions. For example, the techniques and systems described herein can alter the visual appearance of an avatar (e.g., add an audio "ring" around the avatar, change colors, briefly flash, etc.) in the secondary section so that a viewer knows the associated user is the one speaking (e.g., asking a question to the main presenter who is displayed in an individual cell of the primary section). Here, the change of state in the teleconference session is associated with a change in who is speaking. In another example, the techniques and systems described herein can alter the visual appearance of an avatar in the secondary section when an associated user is being called, or asked to join the teleconference session. In this example, an avatar may be displayed in the secondary section prior to a user actually joining the teleconference session, and the change of state in the teleconference session is associated with a user being called, or "nudged" (e.g., a teleconferencing feature to catch a user's attention).

In some examples and as a result of the primary section and the secondary section having different sizes, the transitions based on an event that changes the state of the teleconference session are different for the primary section and the secondary section. For instance, a transition of an individual cell in the primary section can comprise edge to edge movement with respect to predefined positions within the user interface such that a size of an individual cell either increases or decreases based on the movement (e.g., the size of a currently displayed cell is reduced by half to make room for an incoming cell, or the size of a currently displayed cell is doubled to vacate display space of a removed cell). In contrast, an instance of content in the secondary section can be an avatar and a transition of the avatar from one position to another in the secondary section is implemented without adjusting a size of the avatar. An avatar can include posted picture or image (non-video) of a user, or alternatively, an icon or a graphical figure representing the user.

In various examples in which there is a large number of users who join a teleconference session (e.g., ten users, twenty users, thirty users, etc.), and when display space limitations exist making it impossible for each user to be individually represented in positions of either one of the primary section or the secondary section, the systems and techniques are configured to generate and display an overflow representation in the secondary section that indicates a number of "off-screen" users who are not individually represented in positions of either one of the primary section or the secondary section. The systems and techniques are configured to increment or decrement the number of off-screen users by one based at least in part on an added off-screen user or a departed off-screen user. In association with incrementing or decrementing the number of off-screen participants based at least in part on an added off-screen participant or a departed off-screen participant, an avatar of the added off-screen participant or the departed off-screen participant can be displayed (e.g., flashed) for a predefined period of time (e.g., one second, two seconds, etc.) so that a viewer knows who joined the overflow representation (e.g., who joined the teleconference session) or who left the overflow representation (e.g., who left the teleconference session).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 6A-6C illustrate a sequence of example graphical user interfaces that show a transition, in the primary section, from three other participants in a teleconference session to four other participants, thereby reaching a maximum threshold number of participants capable of being displayed in predefined positions of the primary section.

FIGS. 13A-13B illustrates a third set of example graphical user interfaces that show a transition, in the primary section, from four other participants to three other participants.

DETAILED DESCRIPTION

Examples described herein enable a system to implement graphical transitions of displayed content for a teleconference session. In various examples, the transitions comprise coordinated movement of the displayed content between positions so that a user (e.g., a viewer of the displayed content) can easily follow what is happening in a teleconference session. Moreover, the transitions are configured to limit, to the extent possible, the overall amount of movement in the user interface so that the ongoing session experience for the viewer of the displayed content is not interrupted and so that the user viewing a display screen can maintain focus on the ongoing activity (e.g., people already in the teleconference session that are currently speaking). In various examples described herein, a transition is preconfigured to guide movement of the displayed content from one position to another position based on a user joining or a user leaving the teleconference session. Consequently, the transition of the displayed content between positions can be implemented based on a number of users participating in the teleconference session at a given time and/or whether an instance of content being moved is displayed in the primary section or the secondary section.

In various examples described herein, when a user joins the teleconference session, only one cell currently displayed in the primary section changes positions to make room for (e.g., create display space) the incoming cell containing an instance of content associated with joined user.

Various examples, implementations, scenarios, and aspects are described below with reference to FIGS. 1 through 19.

Figure 1:
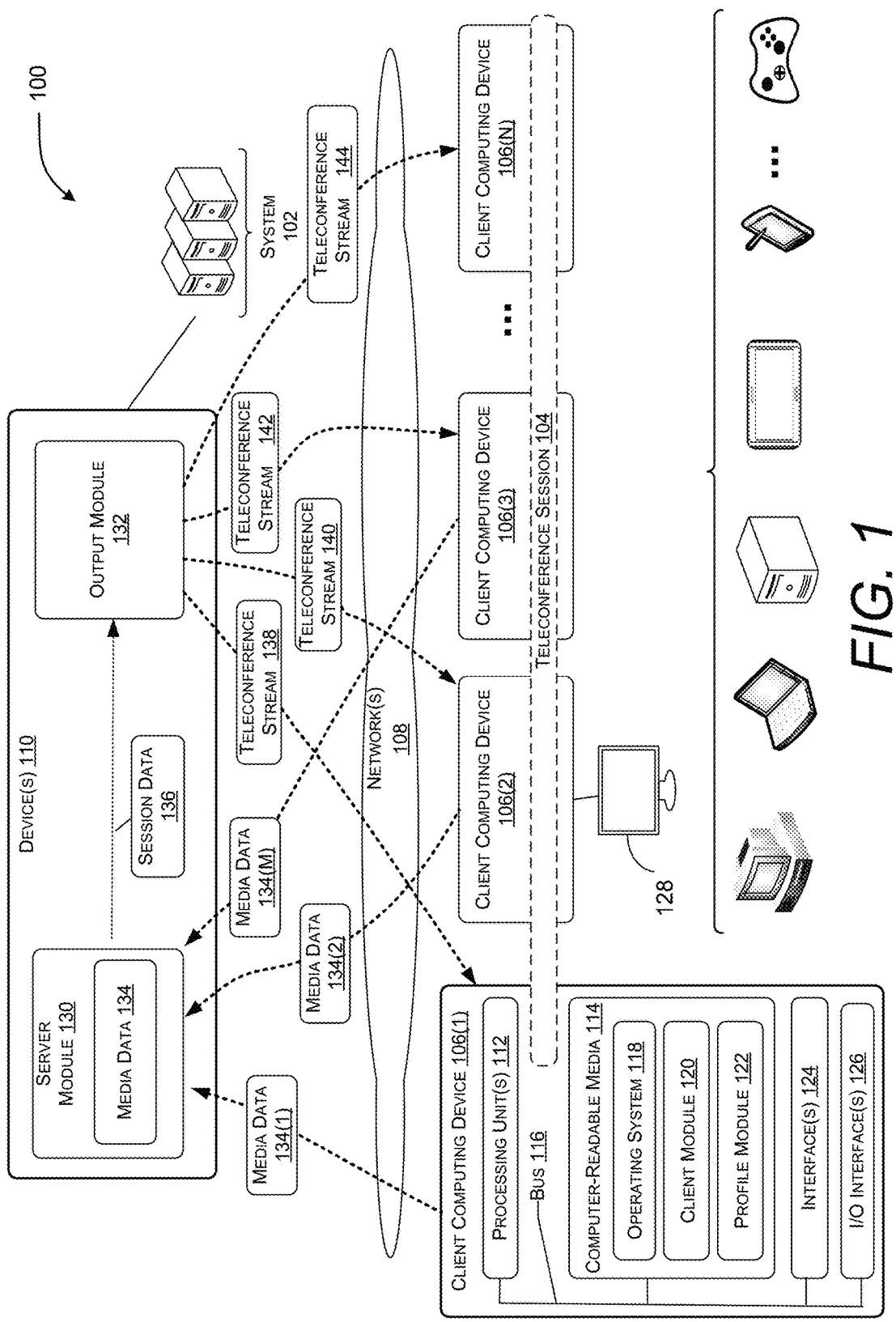
FIG. 1 is a diagram illustrating an example environment in which a system can implement graphical transitions of displayed content for a teleconference session.

FIG. 1 is a diagram illustrating an example environment 100 in which a system 102 can operate to implement graphical transitions of displayed content in a teleconference session 104. In this example, the teleconference session 104 is implemented between a number of client computing devices 106(1) through 106(N) (where N is a positive integer number having a value of two or greater). The client computing devices 106(1) through 106(N) enable users to participate in the teleconference session 104. In this example, the teleconference session 104 is hosted, over one or more network(s) 108, by the system 102. That is, the system 102 can provide a service that enables users of the client computing devices 106(1) through 106(N) to participate in the teleconference session 104. Consequently, a "participant" to the teleconference session 104 can comprise a user and/or a client computing device (e.g., multiple users may be in a conference room participating in a teleconference session via the use of a single client computing device), each of which can communicate with other participants. As an alternative, the teleconference session 104 can be hosted by one of the client computing devices 106(1) through 106(N) utilizing peer-to-peer technologies.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more teleconference sessions 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, a client computing device 106(1) can include input/output ("I/O") interfaces 126 that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like). FIG. 1 illustrates that client computing device 106(2) is in some way connected to a display device 128 (e.g., a display screen), which can present a rendered user interface that contains content associated with the teleconference session 104.

In the example environment 100 of FIG. 1, client computing devices 106(1) through 106(N) may use their respective client modules 120 to connect with one another and/or other external device(s) in order to participate in the teleconference session 104. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network 108.

The client computing device(s) 106(1) through 106(N) may use their respective profile module 122 to generate participant profiles, and provide the participant profiles to other client computing devices and/or to the device(s) 110 of the system 102. A participant profile may include one or more of an identity of a user (e.g., a name, a unique identifier ("ID"), etc.), user data such as personal data, machine data such as location (e.g., an IP address, a room in a building, etc.) and technical capabilities, etc. Participant profiles may be utilized to register participants for teleconference sessions.

As shown in FIG. 1, the device(s) 110 of the system 102 includes a server module 130 and an output module 132. The server module 130 is configured to receive, from individual client computing devices 106(1) through 106(N), media data 134(1) through 134(M) (where M is a positive integer number equal to 2 or greater). Media data can comprise a live video feed (e.g., audio and visual data associated with a user), audio data which is to be output with a presentation of an avatar of a user (e.g., an audio only experience in which live video data of the user is not transmitted), text data (e.g., text messages), screen sharing data (e.g., a document, an image, a video displayed on a display screen, etc.), and so forth. Thus, the server module 130 is configured to receive a collection of various instances of media data 134(1) through 134(M) (the collection being referred to herein as media data 134). In some scenarios, not all the client computing devices utilized to participate in the teleconference session 104 provide an instance of media data, and thus, M (the number of instances submitted) may not be equal to N (the number of client computing devices). For example, a client computing device (e.g., client computing device 106(N) may only be a consuming, or a "listening", device such that it only receives content associated with the teleconference session 104 but does not provide any content to the teleconference session 104.

The server module 130 is also configured to generate session data 136 based on the media data 134. In various examples, the server module 130 can select aspects of the media data 134 that are to be shared with the participating client computing devices 106(1) through 106(N) via a teleconference stream. Consequently, the server module 130 is configured to pass the session data 136 to the output module 132 and the output module 132 may communicate individual teleconference streams to the client computing devices 106(1) through 106(N). As shown, the output module 132 transmits teleconference stream 138 to client computing device 106(1), transmits teleconference stream 140 to client computing device 106(2), transmits teleconference stream 142 to client computing device 106(3), and transmits teleconference stream 144 to client computing device 106 (N). Note that the teleconference streams transmitted to the client computing devices can be the same or can be different (e.g., positioning of instances of content within a user interface may vary from one teleconference stream to the next).

As described above, the teleconference stream can comprise a collection of various instances of content. In various examples, the various instances of content correspond to some of the instances of media data 134(1) through 134(M) received by the server module 130. Thus, an individual instance of content can comprise: a live video feed (e.g., audio and visual data that capture the appearance and speech of user participating in the teleconference session), an avatar of a user participating in the teleconference session along with audio data that captures the speech of a user, or digital content displayed on a display screen of a user along with audio data that captures the speech of a user. The digital content can include, for example, a document, a spreadsheet, presentation slides, an image, a video, etc.

Figure 2:
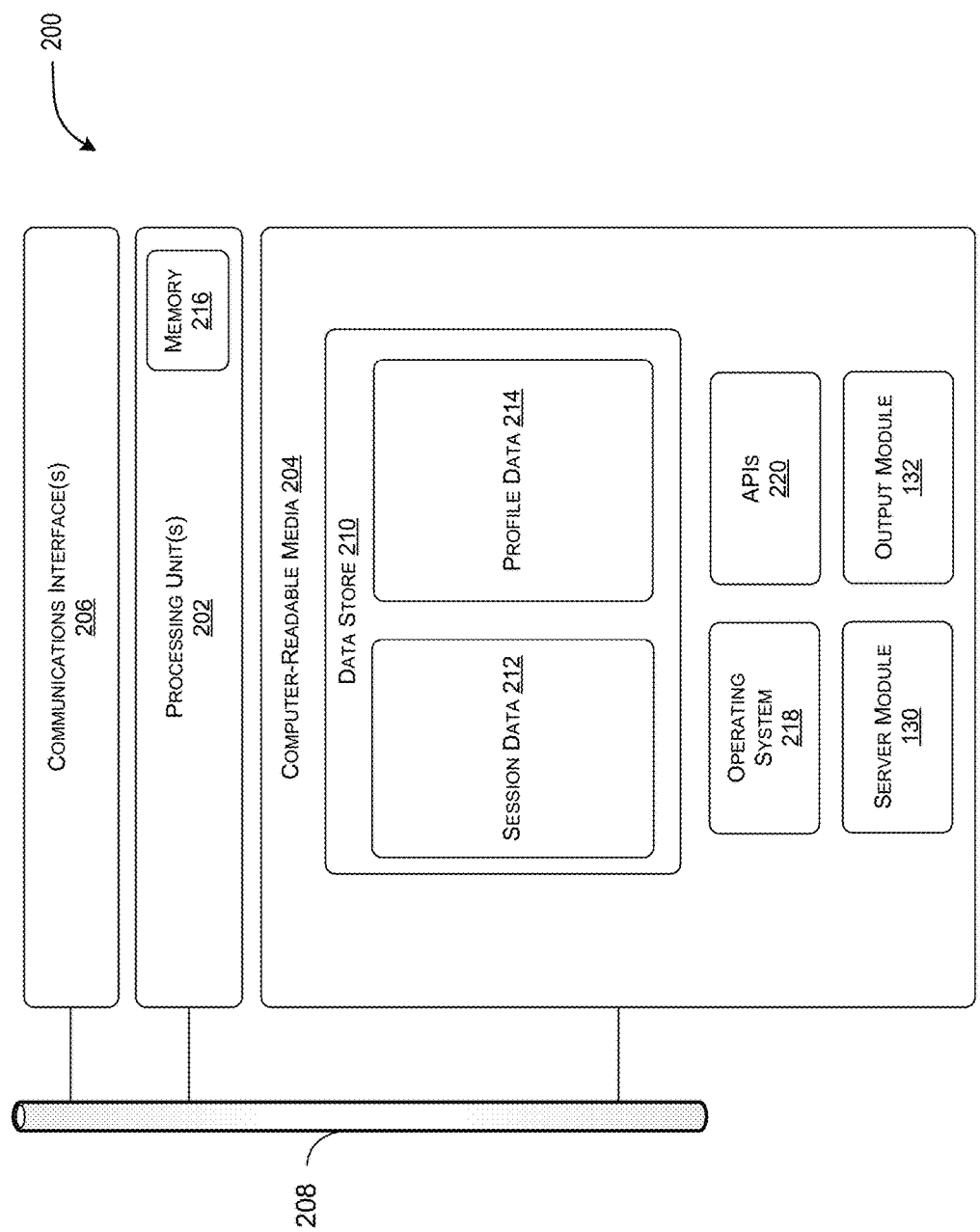
FIG. 2 is a diagram illustrating example components of an example device configured to implement graphical transitions of displayed content for a teleconference session.

FIG. 2 illustrates a diagram that shows example components of an example device 200 configured to implement the graphical transitions in association with a teleconference session 104 between client computing devices, such as client computing devices 106(1) through 106(N). The device 200 may represent one of device(s) 110, where the device 200 includes one or more processing unit(s) 202, computer-readable media 204, communication interface(s) 206. The components of the device 200 are operatively connected, for example, via a bus 208, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS SPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes a data store 210. In some examples, data store 210 includes data storage such as a database, data warehouse, or other type of structured or unstructured data storage. In some examples, data store 210 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 210 may store data for the operations of processes, applications, components, and/or modules stored in computer-readable media 204 and/or executed by processing unit(s) 202 and/or accelerator(s). For instance, in some examples, data store 210 may store session data 212 (e.g., session data 136), profile data 214 (e.g., associated with a participant profile), and/or other data. The session data 212 can include a total number of participants (e.g., users and/or client computing devices) in the teleconference session 104, and activity that occurs in the teleconference session 104, and/or other data related to when and how the teleconference session 104 is conducted or hosted.

Alternately, some or all of the above-referenced data can be stored on separate memories 216 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 218 and application programming interface(s) 220 configured to expose the functionality and the data of the device(s) 110 (e.g., example device 200) to external devices. Additionally, the computer-readable media 204 includes one or more modules such as the server module 130 and an output module 132, although the number of illustrated modules is just an example, and the number may vary higher or lower. That is, functionality described herein in association with the illustrated modules may be performed by a fewer number of modules or a larger number of modules on one device or spread across multiple devices.

As further described herein, the server module 130, the client module 120 of a client computing device, or both, is/are configured to render a teleconference stream in a graphical user interface, and consequently, implement the graphical transitions described herein.

Figure 3:
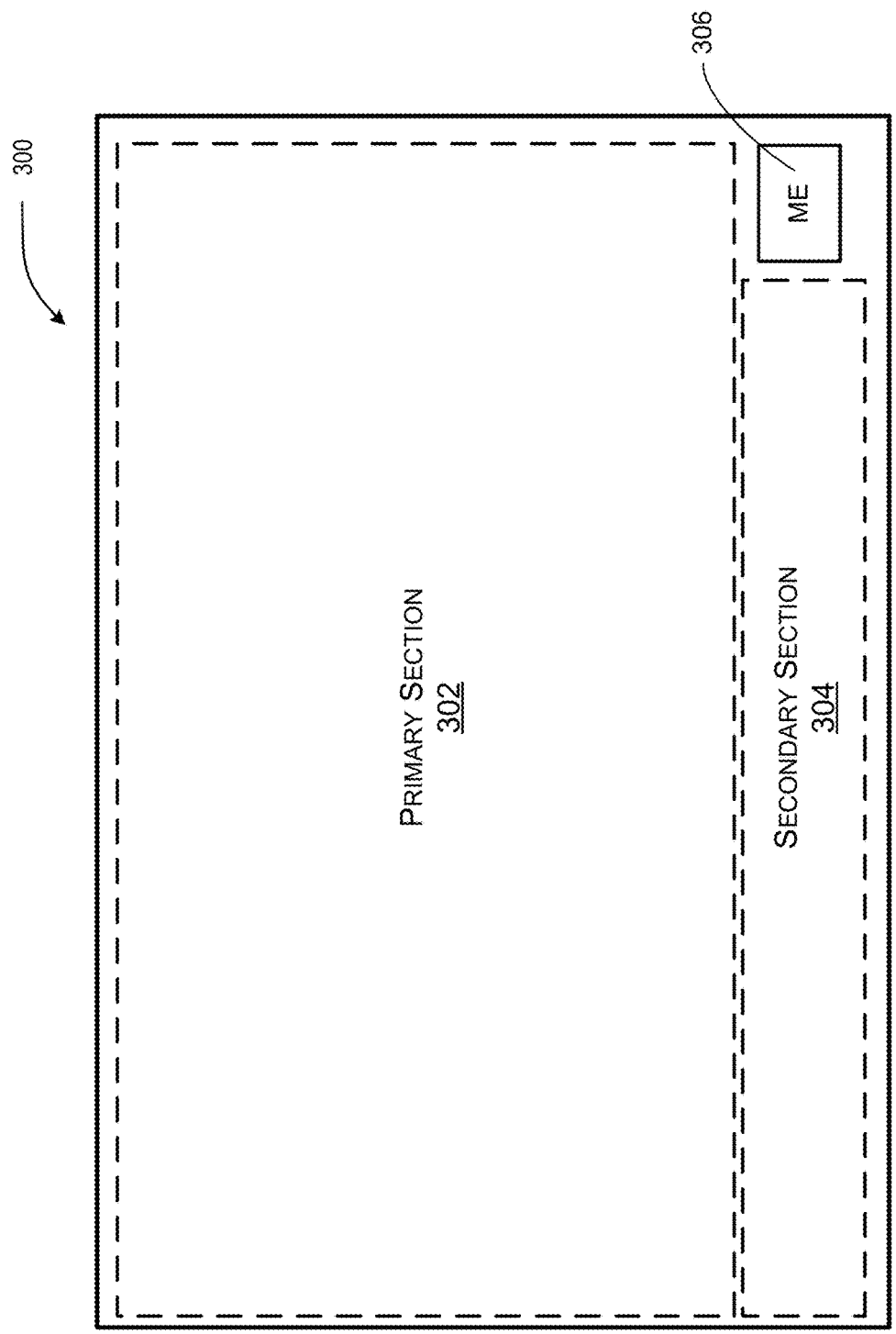
FIG. 3 illustrates an example graphical user interface configured to present the content of a teleconference stream on a display screen, the example graphical user interface including a primary section and a secondary section.

FIG. 3 illustrates an example graphical user interface 300 configured to present the content of a teleconference stream on a display screen (e.g., display screen 128), the example graphical user interface including a primary section 302 and a secondary section 304. Further, in various implementations (e.g., based on a user control), a section 306 of the graphical user interface 300 can display an instance of content being captured at the viewer's own client computing device (e.g., a camera that captures a live video feed of herself or himself) so the viewer can see how she or he appears to others receiving the teleconference stream. Accordingly, this section 306 is referred to as "Me". In some examples the section 306 can be an overlay positioned on top of the primary section 302, the secondary section 304, or both.

In various implementations, only the primary section 302 is displayed and the secondary section 304 is not displayed during the teleconference session. For example, if the number of participants in the teleconference session is less than or equal to the maximum threshold number of cells predetermined for the primary section 302, then the secondary section 304 is not needed to display additional instances of content that do not fit within the primary section 302. In another example, a user control setting may enable a content "view" that minimizes the secondary section 304 so the user can focus his or her attention on the instances of content displayed in the individual cells of the primary section 302.

As shown in FIG. 3, the primary section 302 is displayed in a manner that dominates the graphical user interface 300 on the display screen (e.g., the primary section 302 is larger than the secondary section 304 in the terms of display area). Moreover, individual cells that display instances of content in the primary section 302, as further described herein, are generally much larger in size (e.g., display area) compared to the instances of content provided in the secondary section 304 (e.g., circular avatars). This allows a user viewing the graphical user interface 300 to have a higher level of engagement with primary section participants compared to secondary section participants.

As described above, the instances of content displayed in the primary section 302 can often be more relevant to the teleconference session 104 than those displayed in the secondary section 304. For example, the primary section 302 can display a live video feed of a host user of the teleconference session (e.g., a main presenter in the meeting). In another example, the primary section 302 can display live video feeds associated with users who contribute more activity to the teleconference session (e.g., users who speak more often). On the other hand, the secondary section 304 can be configured to present instances of content associated with more "passive" participants (e.g., listeners to the meeting that occasionally speak but are not a main contributor to the meeting). In one implementation, the secondary section 304 displays an avatar and does not allow a live video feed of a user to be displayed, thereby saving computing resources (e.g., processing resources, memory resources, networking resources, etc.).

FIGS. 4A through 8 provide example graphical user interfaces that illustrate transitions associated with an example scenario where various numbers of other participants have joined, or are joining, a teleconference session.

Figures 4A, 4B, 4C:
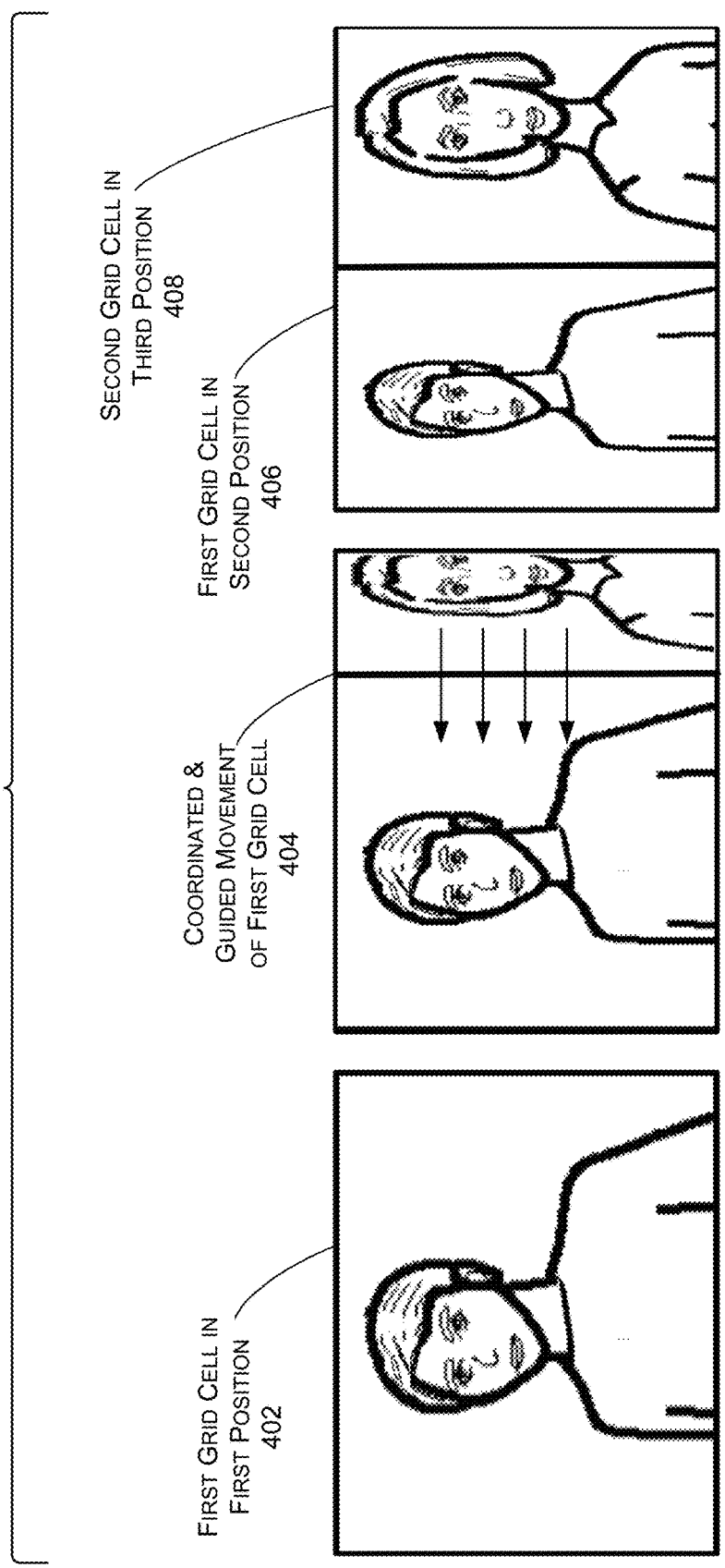
FIGS. 4A-4C illustrate a sequence of example graphical user interfaces that show a transition, in the primary section, from one other participant in a teleconference session to two other participants in the teleconference session.

FIGS. 4A-4C illustrate a sequence of example graphical user interfaces that show a transition, in the primary section, from one other participant in a teleconference session to two other participants 400. The term "other" is used in this context to highlight that the participants displayed in individual positions of the primary section and/or the secondary section of the user interface (e.g., outside the "Me" section) are participants "other" than the viewer of the user interface (e.g., which may be referred to herein as the "viewing" participant).

Thus, the transition illustrated in FIGS. 4A-4C is implemented in response to a second other participant joining a first other participant in the teleconference session (e.g., amounting to a total of three participants in the teleconference session if the viewing participant is counted).

As described above, an individual cell comprises a display area within the user interface that contains an individual instance of content of the teleconference stream. Many of the examples described herein illustrate grid cells in which the display area comprises a square or a rectangle. However, in other examples, the cells can be rounded cells and the display area can be a circle or an oval. Furthermore, in various examples, cells can be offset from one another in a vertical direction and/or a horizontal direction and/or cells can vary in size (e.g., cells can have different height and/or width dimensions).

FIG. 4A illustrates a graphical user interface (GUI) that shows a first grid cell populated with an instance of content associated with the first other participant in a first position 402. As described above, the first position 402 can be a predefined position such that the first grid cell receives all or most of the primary section display area in a teleconference session that includes two total participants (e.g., a time period prior to implementation of the transition shown in FIGS. 4A-4C).

In response to data in the teleconference stream indicating that a second other participant has joined the teleconference session, FIG. 4B illustrates a GUI that shows coordinated and guided movement of the first grid cell 404 to the left side of the primary section to make room for a new or incoming grid cell that contains an instance of content associated with the second other participant that has recently joined the teleconference session. As illustrated and by example, the movement can be a sliding, edge to edge, movement of the instances of content in the two moving grid cells (e.g., the incoming grid cell pushes to the left against the currently displayed grid cell). Consequently, as shown in FIG. 4C, upon completion of the transition, the first grid cell is displayed (e.g., lands) in a second position 406 which is half the size of the display area of the first position 402 previously occupied by the first grid cell, and the second grid cell populated with the new instance of content associated with the second other participant is in a third position 408 that includes the other half of the display area of the first position 402 previously occupied by the first grid cell.

Figures 5A, 5B, 5C:
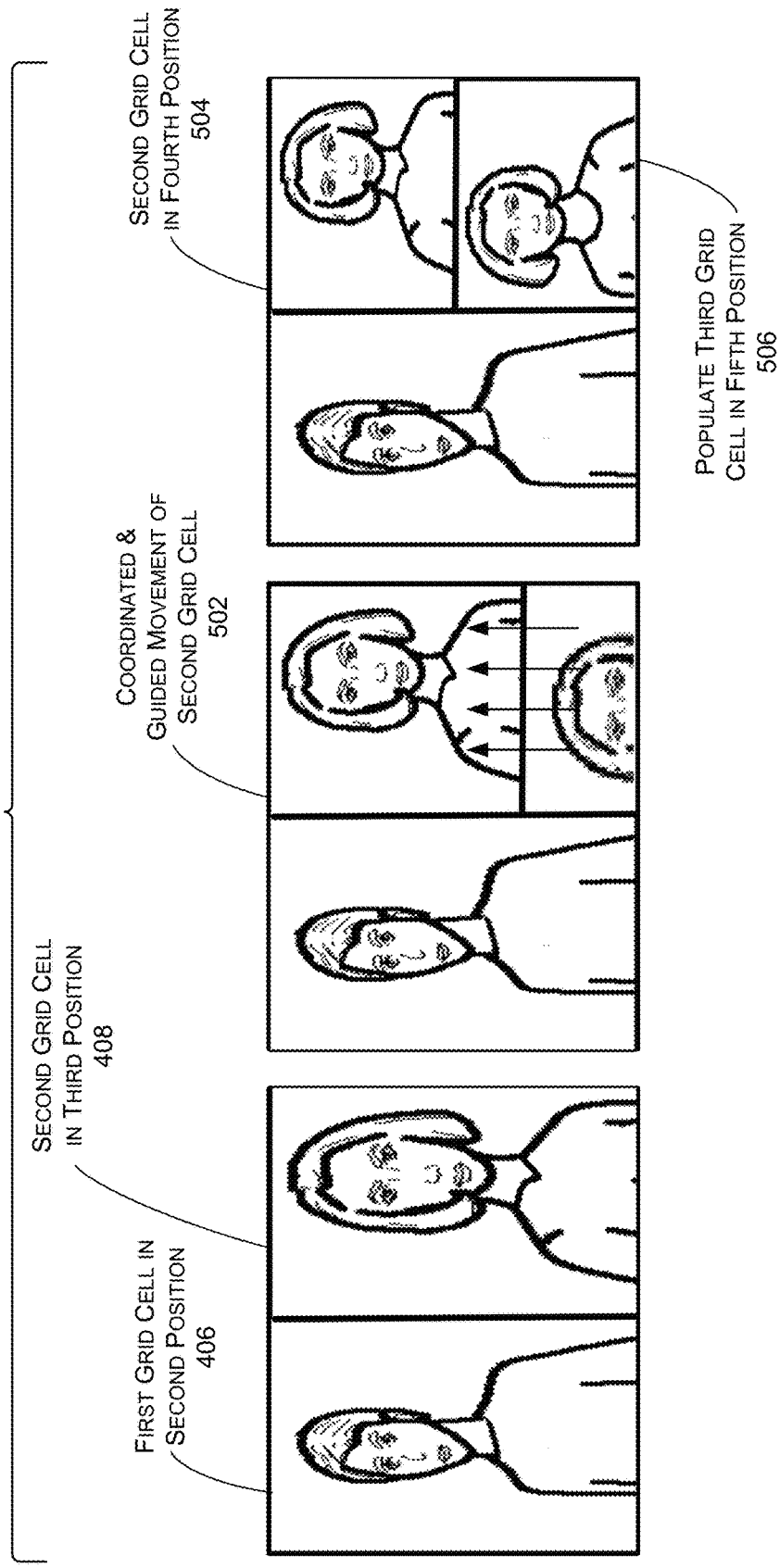
FIGS. 5A-5C illustrate a sequence of example graphical user interfaces that show a transition, in the primary section, from two other participants in a teleconference session to three other participants.

FIGS. 5A-5C illustrate a sequence of example graphical user interfaces that show a transition, in the primary section, from two other participants in a teleconference session to three other participants 500. The transition is implemented in response to a third other participant joining the first and second other participants in the teleconference session (e.g., amounting to a total of four participants in the teleconference session if the viewing participant is counted).

FIG. 5A reproduces, as a starting point for this illustrated transition, the GUI of FIG. 4C that shows the first grid cell in the second position 406 and the second grid cell in the third position 408. As described above, the second position 406 and the third position 408 can be predefined positions for a teleconference session with a total of three participants such that the first other participant to join the teleconference session is displayed on the left side of the primary section while the second other participant to join the teleconference session is displayed on the right side of the primary section.

In response to data in the teleconference stream indicating that a third other participant has joined the teleconference session, FIG. 5B illustrates a GUI that shows coordinated and guided movement 502 of the second grid cell to the top of the primary section to make room for a new or incoming grid cell that contains an instance of content associated with the third other participant that has recently joined the teleconference session. Again, the movement can be a sliding, edge to edge, movement of the instances of content in the two moving grid cells (e.g., the incoming grid cell pushes up against the currently displayed grid cell). Consequently, as shown in FIG. 5C, upon completion of the transition, the second grid cell is displayed (e.g., lands) in a fourth position 504 (e.g., upper right quadrant of the primary section) which is half the size of the third position 408 previously occupied by the second grid cell, and the third grid cell populated with the new instance of content associated with the third other participant is in a fifth position 506 that includes the other half of the display area of the third position 408 previously occupied by the second grid cell. As shown, the transitional movement involves two grid cells (e.g., only one grid cell currently displayed and the incoming grid cell). Stated another way, the first grid cell in the second position is not moved. This limits the overall amount of movement within the primary section so that a viewer is less distracted and so that the user can maintain focus on the activity in the teleconference session.

FIGS. 6A-6C illustrate a sequence of example graphical user interfaces that show a transition, in the primary section, from three other participants in a teleconference session to four other participants 600 (e.g., in this example four is the maximum threshold number of participants capable of being displayed in predefined positions of the primary section 302). The transition is implemented in response to a fourth other participant joining the first, second, and third other participants in the teleconference session (e.g., amounting to a total of five participants in the teleconference session if the viewing participant is counted).

FIG. 6A reproduces, as a starting point for this illustrated transition, the GUI of FIG. 5C that shows the second grid cell in the fourth position 504 and the third grid cell in the fifth position 506. As described above, the fourth position 504 and the fifth position 506 can be predefined positions for a teleconference session with a total of four participants such that a second other participant to join the teleconference session is displayed in the upper right side of the primary section while the third other participant to join the teleconference session is displayed on the lower right side of the primary section.

In response to data in the teleconference stream indicating that a fourth other participant has joined the teleconference session, FIG. 6B illustrates a GUI that shows coordinated and guided movement 602 of the first grid cell to the top of the primary section to make room for a new or incoming grid cell that contains an instance of content associated with the fourth other participant that has recently joined the teleconference session. Again, the movement can be a sliding, edge to edge, movement of the instances of content in the two moving grid cells (e.g., the incoming grid cell pushes up against the currently displayed grid cell). Consequently, as shown in FIG. 6C, upon completion of the transition, the first grid cell is displayed (e.g., lands) in a sixth position 604 (e.g., upper left quadrant of the primary section) which is half the size of the second position 406 previously occupied by the first grid cell, and the fourth grid cell populated with the new instance of content associated with the fourth other participant is in a seventh position 606 that includes the other half of the display area of the second position 406 previously occupied by the first grid cell. As shown, the transitional movement involves two grid cells (e.g., only one grid cell currently displayed and the incoming grid cell). Stated another way, the second grid cell in the fourth position and the third grid cell in the fifth position are not moved. This limits the overall amount of movement within the primary section so that a viewer is less distracted and so that the user can maintain focus on the activity in the teleconference session.

After the fourth other participant has joined the teleconference session, the server module 130 and/or the client module 120 determines that the primary section in this example has reached its maximum threshold number of grid cells and is thus full (e.g., the primary section is unable to accommodate any additional instances of content). As shown in FIGS. 4A-4C, 5A-5C, and 6A-6C, the first position 402, the second position 406, the third position 408, the fourth position 504, the fifth position 506, the sixth position 604, and the seventh position 606 are each a predefined position for an individual grid cell, configuration of which depends on a number of "other" people (e.g., one, two, three, or four) that have joined the teleconference session to communicate with the viewing participant of the display screen.

Moreover, as illustrated, each transition to add a new grid cell and populate the new grid cell with an instance of content only affects one currently displayed grid cell. That is, for each transition shown with respect to FIGS. 4A-4C, 5A-5C, and 6A-6C, only one current displayed grid cell is moved to make room for the new, incoming grid cell. The other grid cell(s) do not move and remain in their same, previous positions. This minimizes an amount of overall movement within the primary section of the graphical user interface, and therefore, limits an amount of distraction to the viewing user. Moreover, a new position of an individual grid cell after a transition still comprises or occupies a display area of the user interface that was part of a previous position of the individual grid cell prior to the transition (e.g., the grid cell size is cut in half). Accordingly, this allows the positioning of a grid cell, though reduced in size, to maintain a level of consistency so that a viewer can easily follow who has been added to the teleconference session without interruption to the session experience.

Figure 7:
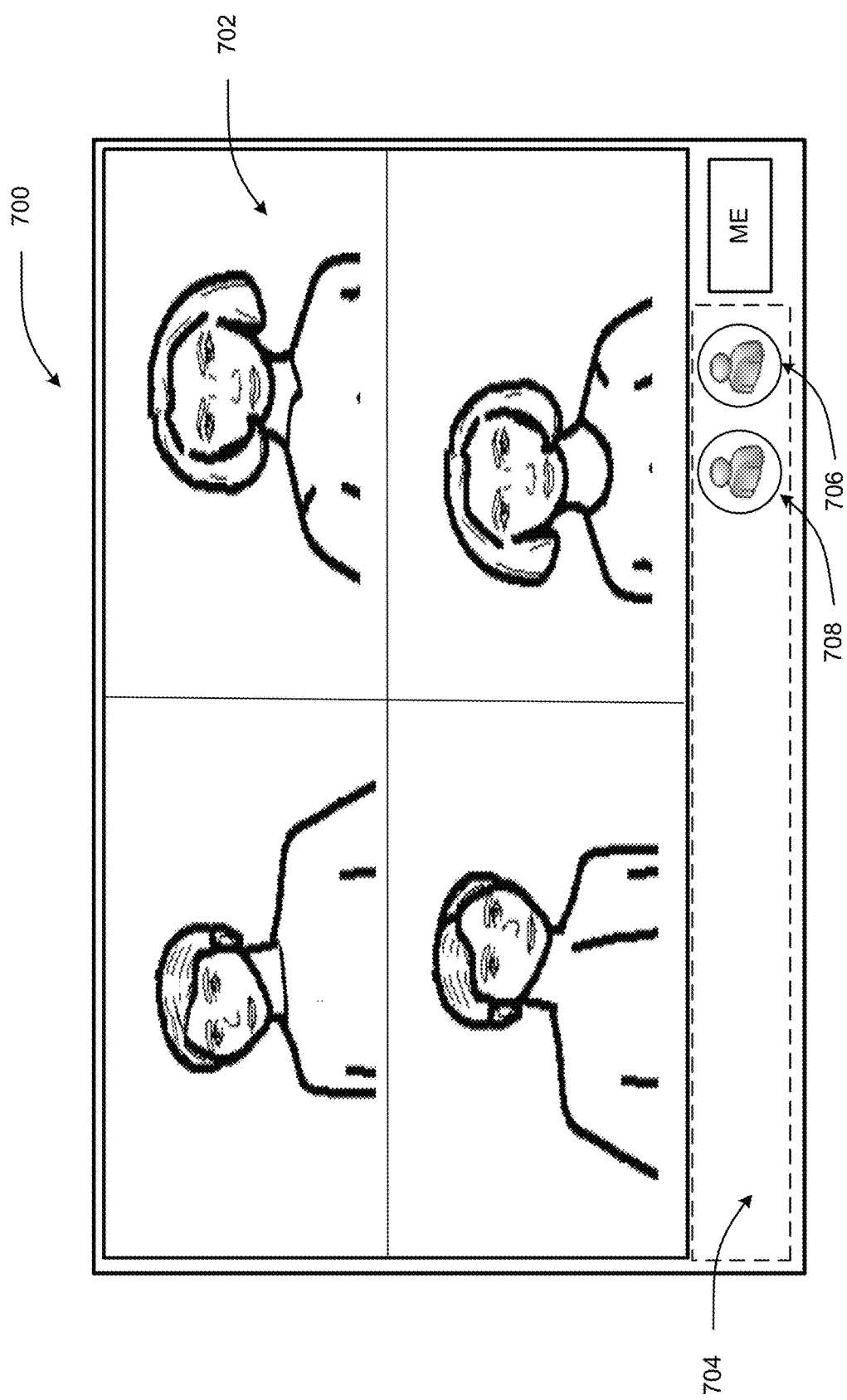
FIG. 7 illustrates an example graphical user interface that displays a full primary section (e.g., with a maximum threshold number of populated grid cells) and a secondary section that includes additional instances of content (e.g., avatars) associated with additional participants that have joined the teleconference session.

FIG. 7 illustrates an example graphical user interface 700 that displays a full primary section 702 (e.g., with a maximum number of populated grid cells which is four in this example) and a secondary section 704 that includes additional instances of content (e.g., avatars) associated with additional participants that have joined the teleconference session, or that are being asked to join the teleconference session (e.g., called, nudged, etc.). In various examples, the additional participants join the teleconference session after the participants displayed in the primary section. Accordingly, a first avatar associated with a first additional participant to join the teleconference session is rendered and displayed in a first position 706 of the secondary section 704 and a second avatar associated with a second additional participant to join the teleconference session is displayed in a second position 708 of the secondary section 704. Continuing with the examples illustrated in FIGS. 4A-4C, 5A-5C, and 6A-6C, the teleconference session illustrated in FIG. 7 now includes six participants other than the viewing participant or seven total participants (e.g., four active participants for which content is displayed in the primary section 702, two passive participants for which content is displayed in the secondary section 704, and the viewing participant for which content can be displayed in a "Me" section).

In various examples, a representation in the secondary section 704 such as an avatar can have its visual appearance altered (e.g., without changing position) in response to an event that changes the state of the teleconference session. For example, if a participant represented by an avatar in the secondary section 704 speaks during the teleconference session, the participant's avatar may be visually animated to alter its appearance and show the audio output associated with the speech (e.g., add an audio "ring" around the avatar, change colors, briefly flash, etc.). In another example, the visual appearance of an avatar in the secondary section 704 can be altered when a participant is being called, or asked to join the teleconference session. In this example, an avatar may be displayed in the secondary section 704 prior to the participant actually joining the teleconference session.

Figure 8:
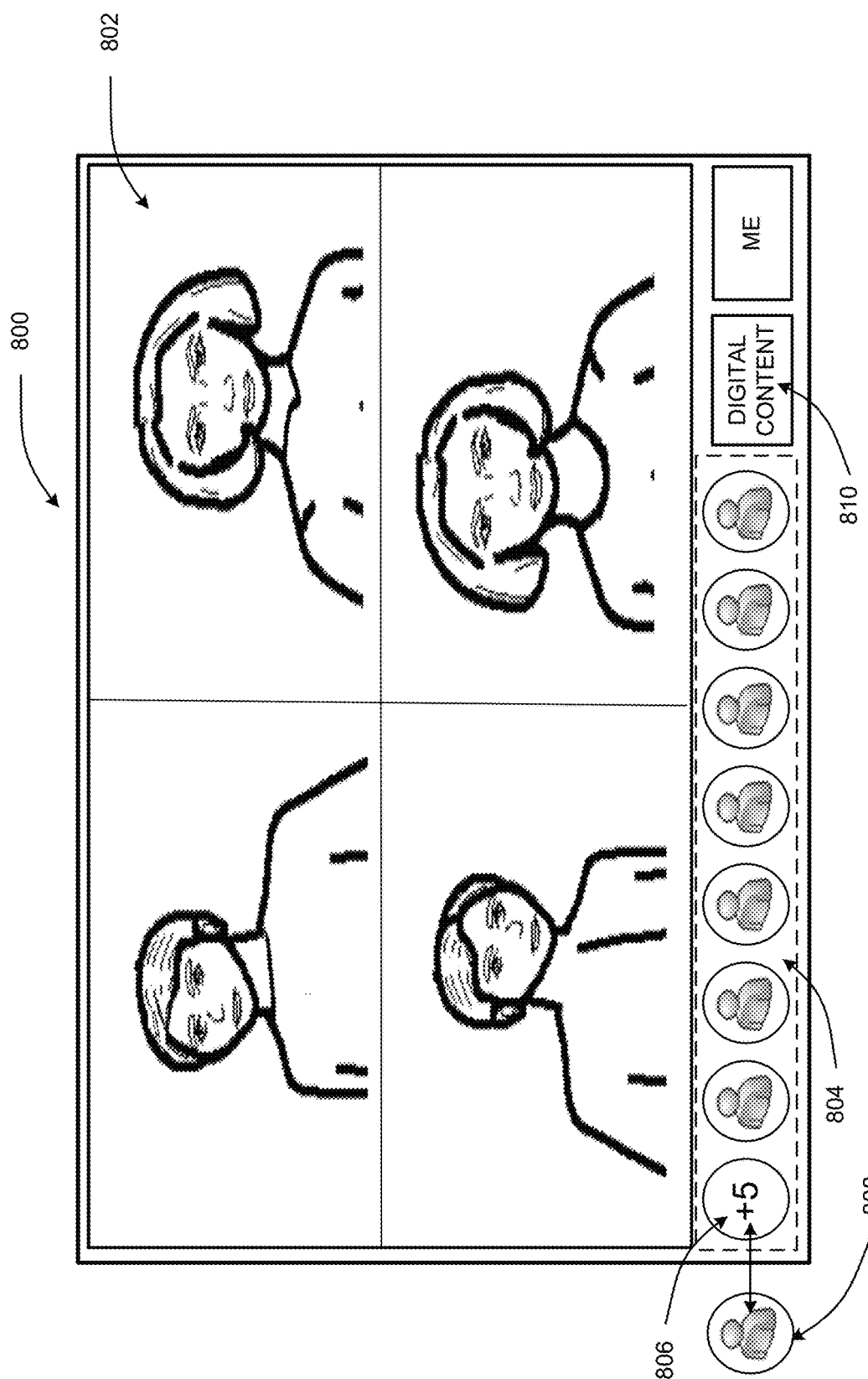
FIG. 8 illustrates an example graphical user interface that displays a full primary section and a full secondary section that includes an overflow representation.

FIG. 8 illustrates an example graphical user interface 800 that still displays a full primary section 802 (e.g., with a maximum threshold number of populated grid cells which is four in this example) and a full secondary section 804 that includes additional instances of content (e.g., avatars) associated with additional participants that have joined the teleconference session. In this example GUI 800, seven participants are individually represented by an avatar in the secondary section 804 (e.g., initially positioned from right to left in the secondary section based on an order of when a participant joined the teleconference session). Since there is no additional display space to present more avatars, an overflow representation 806 is generated and displayed in the secondary section 804. The overflow representation 806 indicates a number of off-screen participants (e.g., "+5" or five off-screen participants) that are not individually represented in either one of the primary section 802 (e.g., via a grid cell) or the secondary section 804 (e.g., via a circular avatar). The number of off-screen participants indicated in the overflow representation 806 can be incremented or decremented by one based on an added off-screen participant or a departed off-screen participant. For example, an off-screen participant can be escalated to an individual avatar representation in the secondary section 804 if a position opens up due to someone leaving the teleconference session. In another example, an off-screen participant can be escalated to an individual grid cell via a switch if the off-screen participant is determined to have a high level of activity in the teleconference session. In yet another example, an off-screen participant can leave (e.g., depart) the teleconference session.

In various examples, incrementing or decrementing the number of off-screen participants based at least in part on an added off-screen participant or a departed off-screen participant can comprise displaying an avatar of the added off-screen participant or the departed off-screen participant. For instance, an avatar 808 can be displayed (e.g., flashed) for a predefined period of time (e.g., one second, two seconds, etc.) in place of the overflow representation 806 so that a viewer knows who joined the overflow representation (e.g., who joined the teleconference session) or who left the overflow representation (e.g., who left the teleconference session). Furthermore, the overflow representation 806 can briefly be replaced with an avatar 808 of a user when the user represented by the overflow representation 806 speaks during the teleconference session, or is being called or nudged to join a teleconference session.

Consequently, with the number indicated in the overflow representation 806, and continuing the examples illustrated in FIGS. 4A-4C, 5A-5C, 6A-6C, and 7, the teleconference session illustrated in FIG. 8 now includes sixteen participants other than the viewing participant or seventeen total participants (e.g., four active participants for which content is displayed in the primary section 802, seven passive participants for which individual avatars are displayed in the secondary section 804, five passive and off-screen participants represented in the overflow 806, and the viewing participant for which content can be displayed in a "Me" section).

FIG. 8 further illustrates a representation of digital content 810. In various examples, the digital content 810 (e.g., a document, a presentation, a video, etc.) can be displayed in the primary section, as part of an alternative view and based on a user control.

Figure 9:
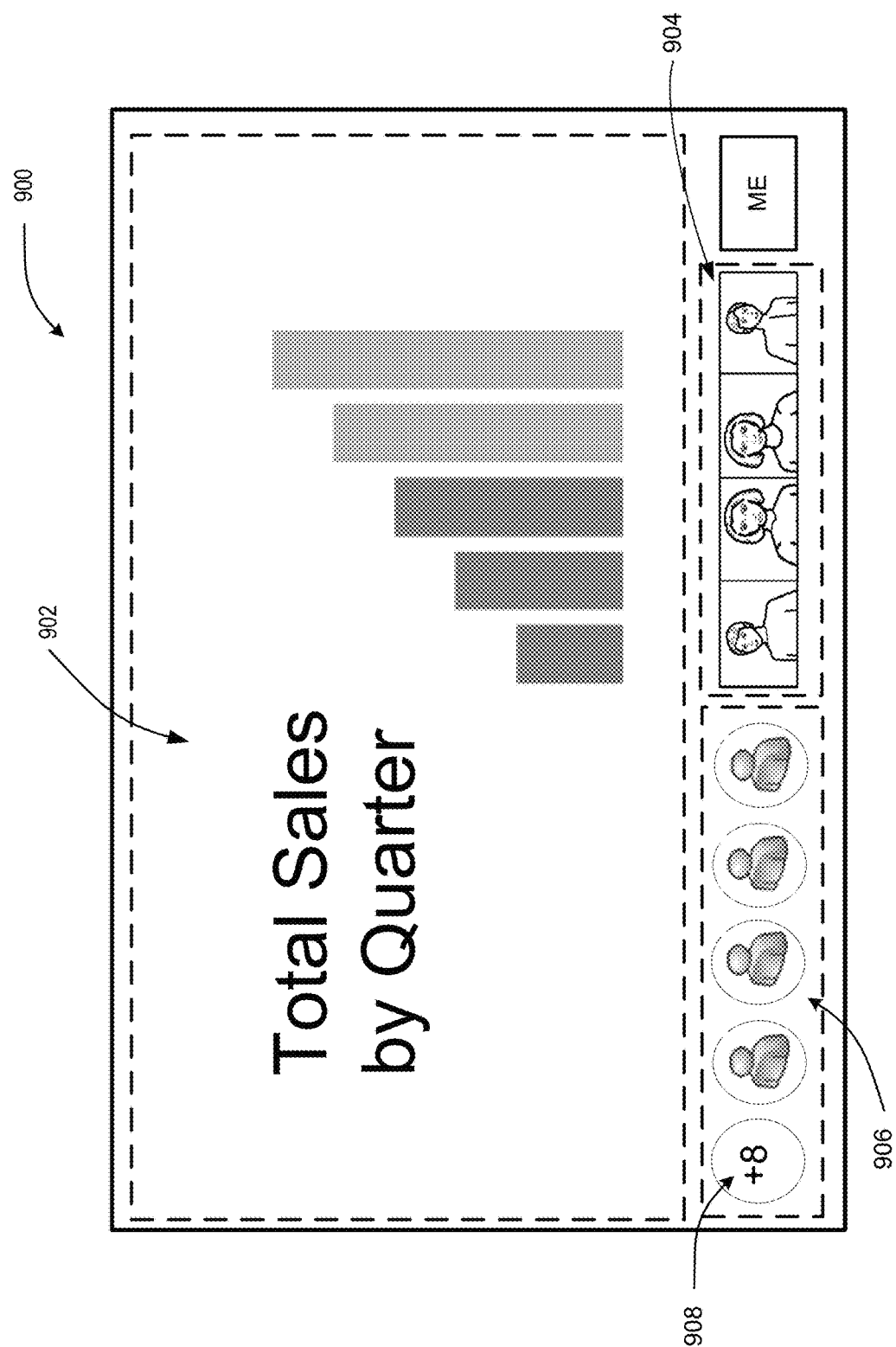
FIG. 9 illustrates an example graphical user interface that displays digital content comprising a slide in the primary section thereby reducing the size of a secondary section and causing the number of off-screen participants indicated in the overflow representation to be increased.

FIG. 9 illustrates an example graphical user interface 900 that displays the digital content 810 of FIG. 8 in the primary section 902 (e.g., the digital content comprises a slide that illustrates a "total sales by quarter"). Because the primary section 902 is populated with digital content in this alternative view, the individual grid cells previously presented in the primary section 902 are presented in another primary section 904 at the bottom of the user interface. Consequently, to make room for the other primary section 904, the size of the secondary section 906 is reduced (compared to the size of the secondary section 804 in FIG. 8), and only includes enough display area for avatars of four participants and an overflow representation 908. Accordingly, the number indicated by the overflow representation 908 in FIG. 9 increments the number indicated by the overflow representation 808 in FIG. 8 by three (e.g., "+5" is incremented to "+8") because three of the seven avatars previously displayed in the secondary section 802 of FIG. 8 had to be removed due to the reduced size of the secondary section 906.

Thus, in various implementations, the secondary section does not have a set predetermined maximum number of positions like the primary section. Rather, the number of positions available to display an instance of content (e.g., avatar) prior to having to implement the overflow representation varies, and scales, based on one or more of: a type of configurable view (e.g., FIG. 8 vs. FIG. 9), a minimum size of an avatar (e.g., the system does not want to continuously shrink an avatar to the point where a viewer is unable to identify a user associated with the avatar), a size of the user interface, a size of a display screen, and so forth.

FIGS. 10 through 17C provide example graphical user interfaces that illustrate transitions associated with an example scenario where various numbers of other participants leave a teleconference session.

Figure 10:
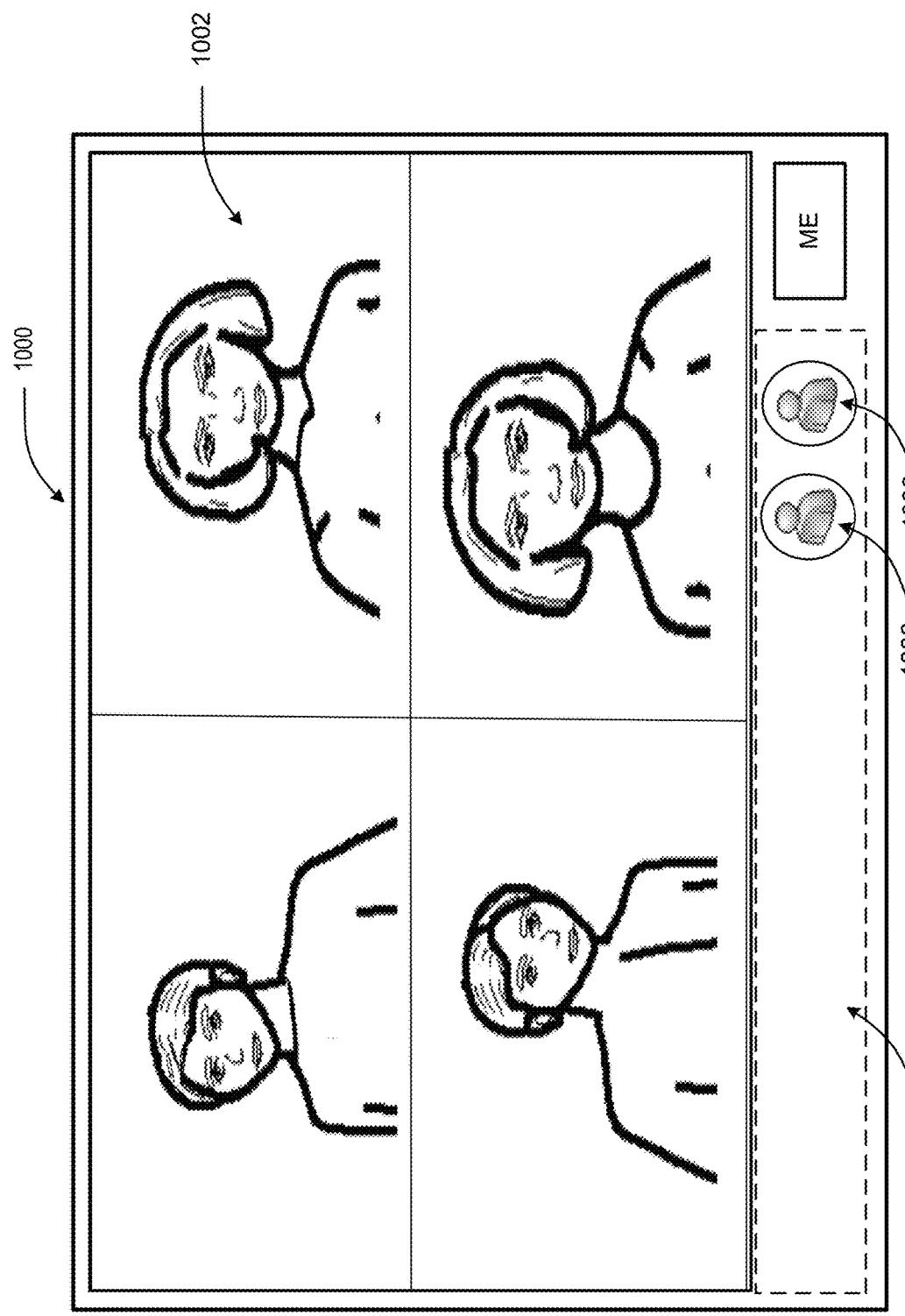
FIG. 10 illustrates an example graphical user interface that comprises a full primary section, but the number of individual instances of content (e.g., avatars) positioned in the secondary section is beginning to decrease due to participants leaving a teleconference session.

FIG. 10 illustrates an example graphical user interface 1000 that still comprises a full primary section 1002, but the number of individual instances of content (e.g., avatars) positioned in the secondary section 1004 is beginning to decrease due to participants leaving a teleconference session. Accordingly, FIG. 10 no longer displays an overflow representation in the secondary section 1004, and only displays two avatars 1006 and 1008. Moreover, when an avatar positioned in the secondary section 1004 is removed due to a participant leaving the teleconference session, the remaining avatars transition (e.g., move) to the right side of the secondary section 1004. Accordingly, the viewing user can easily determine how many other participants are still in the teleconference session (e.g., six in this example).

Instances of content in the secondary section 1004 can be used to populate individual grid cells in the primary section 1002 if a participant in the primary section 1002 leaves. That is, an avatar in the secondary section 1004, can be switched to a live video feed, can be moved up, and can take the place of a grid cell to replace a removed instance of content. In this way, the four individual grid cells do not have to change (e.g., transition between) positions. Consequently, the primary section 1004 may be populated with different instances of content over a period of time, yet the positions of the grid cells do not necessarily change. Stated another way, the teleconference session may begin populating the primary section with a first group of people and the teleconference may end with a second group of people (e.g., at least one different participant) in the primary section.

In some examples, an individual instance of content in a position of the secondary section 1004 can be switched (e.g., swapped) with an individual instance of content in a grid cell in the primary section 1102. The switch can occur in response to a determination that a monitored level of activity of the individual instance of content in the secondary section 1004 exceeds a monitored level of activity of the individual instance of content in the primary section 1002. Further, in some implementations, the individual instance of content in the secondary section 1004 can change from an avatar to a live video feed based on the switch while the individual instance of content in the primary section 1002 can change from a live video feed to an avatar.

Figure 11B:
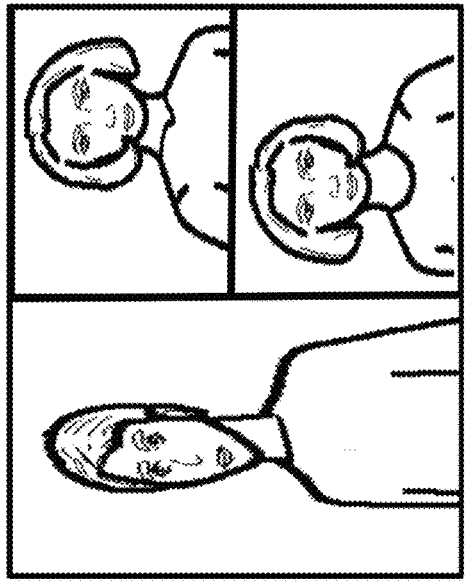
FIGS. 11A-11B illustrates a first set of example graphical user interfaces that show a transition, in the primary section, from four other participants to three other participants.
Figure 11A:
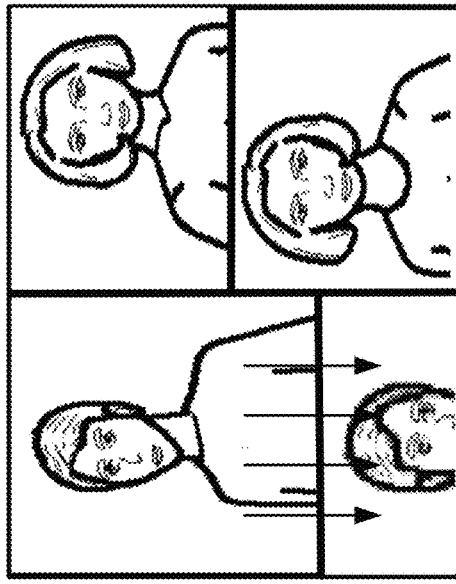

FIGS. 11A-11B illustrates a first set of example graphical user interfaces that show a transition, in the primary section, from four other participants to three other participants 1100. At this point in time, the secondary session is empty and may no longer be displayed because it is no longer populated with any instances of content (e.g., it is no longer needed because the number of participants still in the teleconference session is equal to or less than the maximum threshold number that the primary section is configured to accommodate).

In association with the example in FIG. 11A, the fourth grid cell in the seventh position (e.g., position 606 in FIG. 6C) is removed 1102 because the participant contained therein has left the teleconference session. As part of the removal, the fourth grid cell is transitioned (e.g., moved) down and is pushed out of the primary section and the first grid cell previously in the sixth position (e.g., position 604 in FIG. 6C) increases its size (e.g., doubles in size) by acquiring the display space vacated by the fourth grid cell. That is, the first grid cell is configured in the second position 1104 (e.g., position 406 in FIG. 4C) subsequent to the transition, as shown in FIG. 11B.

Figure 12B:
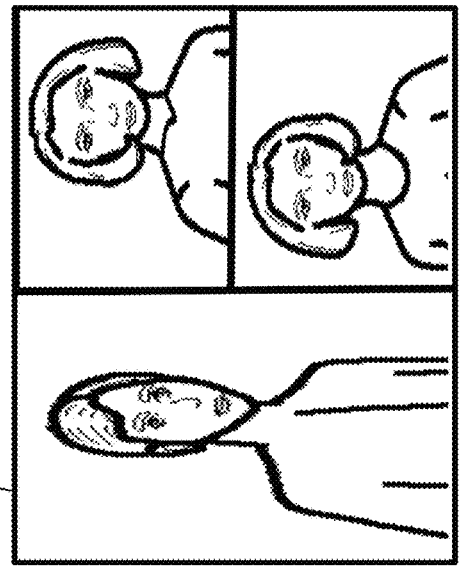
FIGS. 12A-12B illustrates a second set of example graphical user interfaces that show a transition, in the primary section, from four other participants to three other participants.
Figure 12A:
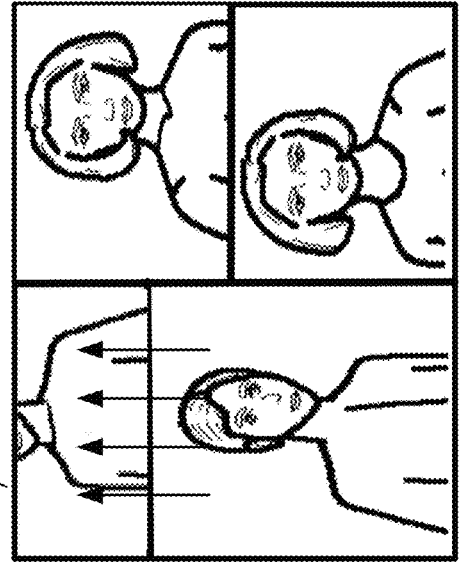

FIGS. 12A-12B illustrates a second set of example graphical user interfaces that show a transition, in the primary section, from four other participants to three other participants 1200. Again, at this point in time, the secondary session is empty and may no longer be displayed because it is no longer populated with any instances of content.

In association with the example in FIG. 12A, the first grid cell in the sixth position (e.g., position 604 in FIG. 6C) is removed 1202 because the participant contained therein has left the teleconference session. As part of the removal, the first grid cell is transitioned (e.g., moved) up and is pushed out of the primary section and the fourth grid cell previously in the seventh position (e.g., position 606 in FIG. 6C) increases its size (e.g., doubles in size) by acquiring the display space vacated by the first grid cell. That is, the fourth grid cell is configured in the second position 1204 (e.g., position 406 in FIG. 4C) subsequent to the transition, as shown in FIG. 12B.

FIGS. 13A-13B illustrates a third set of example graphical user interfaces that show a transition, in the primary section, from four other participants to three other participants 1300. Again, at this point in time, the secondary session is empty and may no longer be displayed because it is no longer populated with any instances of content.

In association with the example in FIG. 13A, the third grid cell in the fifth position (e.g., position 506 in FIG. 5C) is removed 1302 because the participant contained therein has left the teleconference session. As part of the removal, the third grid cell is transitioned (e.g., moved) down and is pushed out of the primary section and the second grid cell previously in the fourth position (e.g., position 504 in FIG. 5C) increases its size (e.g., doubles in size) by acquiring the display space vacated by the third grid cell. That is, the second grid cell is configured in the third position 1304 (e.g., position 408 in FIG. 4C) subsequent to the transition, as shown in FIG. 13B.

Figure 14B:
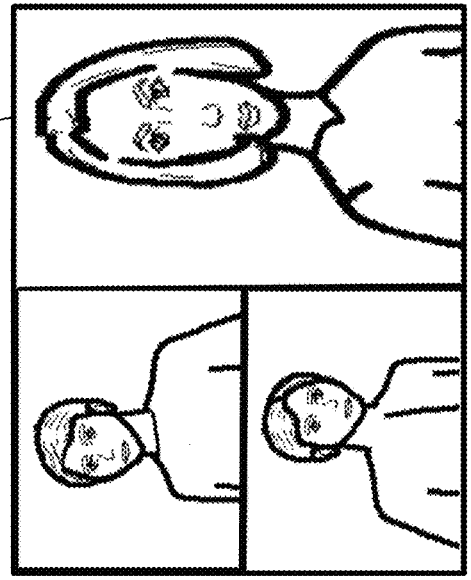
FIGS. 14A-14B illustrates a fourth set of example graphical user interfaces that show a transition, in the primary section, from four other participants to three other participants.
Figure 14A:
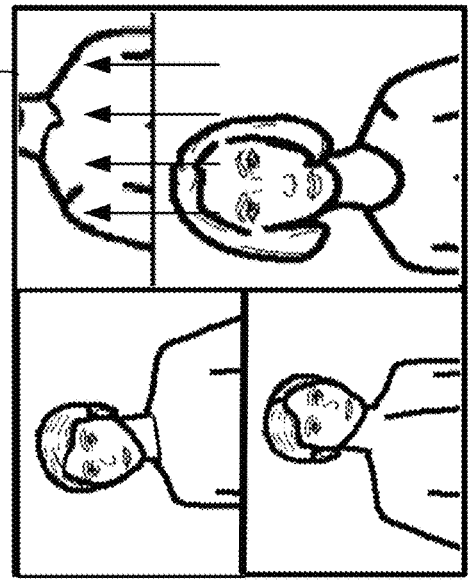

FIGS. 14A-14B illustrates a fourth set of example graphical user interfaces that show a transition, in the primary section, from four other participants to three other participants 1400. Again, at this point in time, the secondary session is empty and may no longer be displayed because it is no longer populated with any instances of content.

In association with the example in FIG. 14A, the second grid cell in the fourth position (e.g., position 504 in FIG. 5C) is removed 1402 because the participant contained therein has left the teleconference session. As part of the removal, the second grid cell is transitioned (e.g., moved) up and is pushed out of the primary section and the third grid cell previously in the fifth position (e.g., position 506 in FIG. 5C) increases its size (e.g., doubles in size) by acquiring the display space vacated by the second grid cell. That is, the third grid cell is configured in the third position 1404 (e.g., position 408 in FIG. 4C) subsequent to the transition, as shown in FIG. 14B.

Implementation of the transitions illustrated in FIGS. 11A-11B, 12A-12B, 13A-13B, and 14A-14B depend on which instance of content is removed (e.g., the position of the grid cell).

Figure 15A:
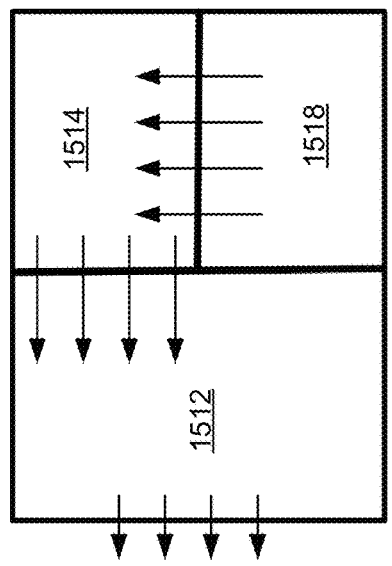
FIGS. 15A-15D illustrate a first set of example user interfaces that show a transition, in the primary section, from three other participants to two other participants.
Figure 15B:
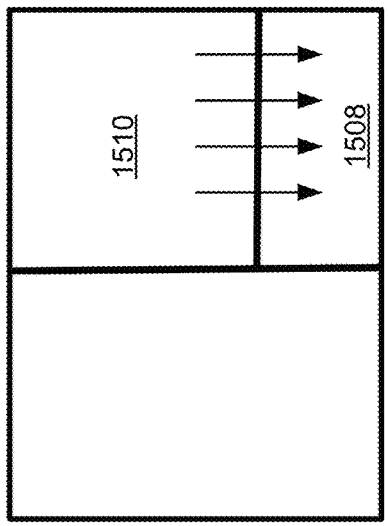
Figure 15C:
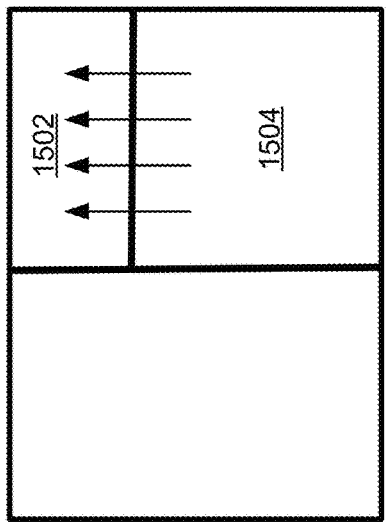
Figure 15D:
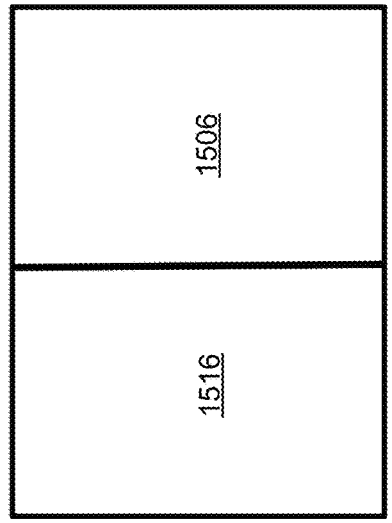

FIGS. 15A-15D illustrate a first set of example user interfaces that show a transition, in the primary section, from three other participants to two other participants 1500. FIG. 15A illustrates the removal of the second grid cell from the fourth position 1502 and the expansion of the third grid cell from the fifth position 1504 to the third position 1506 illustrated in FIG. 15D (e.g., via the acquisition of the vacated display space). FIG. 15B illustrates the removal of the third grid cell from the fifth position 1508 and the expansion of the second grid cell from the fourth position 1510 to the third position 1506 illustrated in FIG. 15D (e.g., via the acquisition of the vacated display space). FIG. 15C illustrates the removal of either the first or fourth grid cell from the second position 1512 and the expansion of the second grid cell from the fourth position 1514 to the second position 1516 illustrated in FIG. 15D, and the expansion of the third grid cell from the fifth position 518 to the third position 1506 illustrated in FIG. 15D (e.g., via the acquisition of the vacated display space).

Figure 16A:
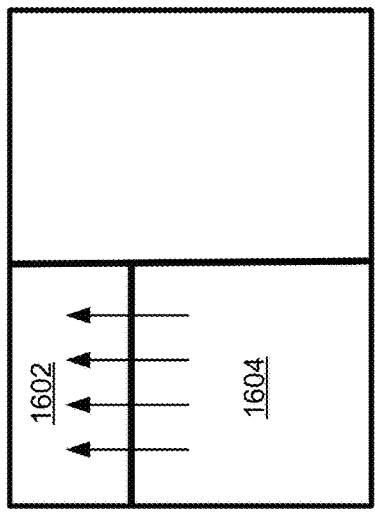
FIGS. 16A-16D illustrate a second set of example user interfaces that show a transition, in the primary section, from three other participants to two other participants.
Figure 16B:
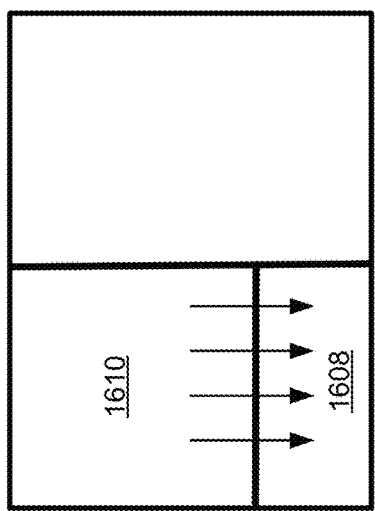
Figure 16C:
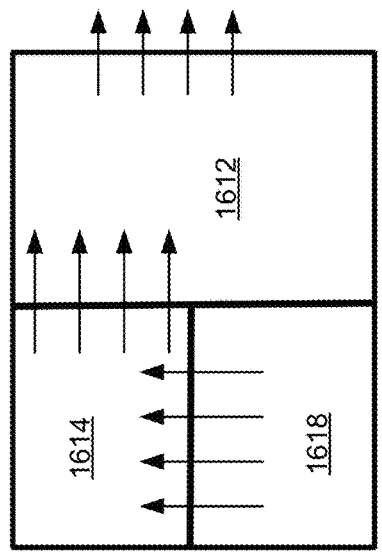
Figure 16D:
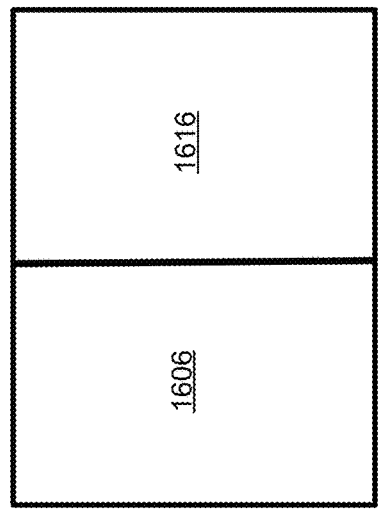

FIGS. 16A-16D illustrate a second set of example user interfaces that show a transition, in the primary section, from three other participants to two other participants 1600. FIG. 16A illustrates the removal of the first grid cell from the sixth position 1602 and the expansion of the fourth grid cell from the seventh position 1604 to the second position 1606 illustrated in FIG. 16D (e.g., via the acquisition of the vacated display space). FIG. 16B illustrates the removal of the fourth grid cell from the seventh position 1608 and the expansion of the first grid cell from the sixth position 1610 to the second position 1606 illustrated in FIG. 16D (e.g., via the acquisition of the vacated display space). FIG. 16C illustrates the removal of either the second or third grid cell from the third position 1612 and the expansion of the first grid cell from the sixth position 1614 to the third position 1616 illustrated in FIG. 16D, and the expansion of the fourth grid cell from the seventh position 618 to the second position 1606 illustrated in FIG. 16D (e.g., via the acquisition of the vacated display space).

Figure 17A:
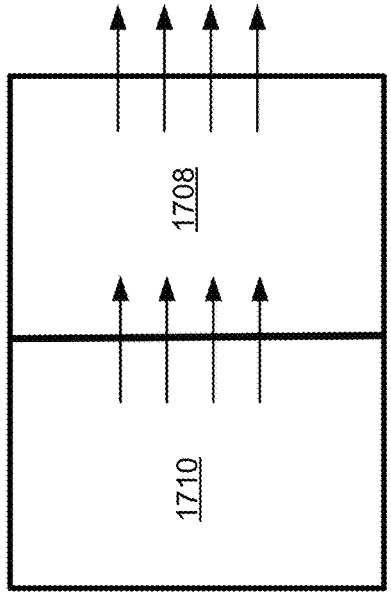
FIGS. 17A-17C illustrate a set of example user interfaces that show a transition, in the primary section, from two other participants to one other participant.
Figure 17B:
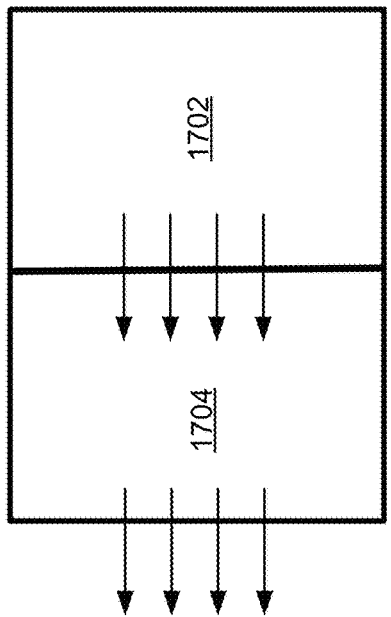
Figure 17C:
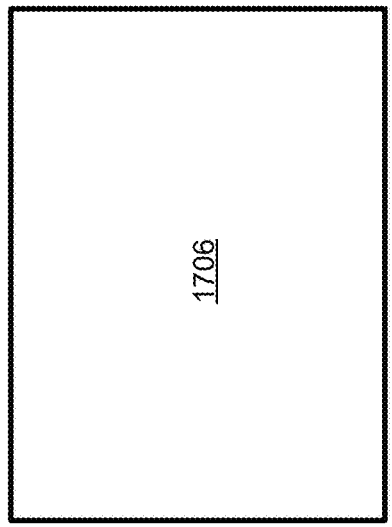

FIGS. 17A-17C illustrate a set of example user interfaces that show a transition, in the primary section, from two other participants to one other participant 1700. FIG. 17A illustrates the removal of a grid cell from the second position 1702 and the expansion of another grid cell from the third position 1704 to the first position 1706 illustrated in FIG. 17C (e.g., via the acquisition of the vacated display space). FIG. 17B illustrates the removal of a grid cell from the third position 1708 and the expansion of another grid cell from the second position 1710 to the first position 1706 illustrated in FIG. 17C (e.g., via the acquisition of the vacated display space).

As described above in the examples of FIGS. 4A through 17C, the systems and techniques can follow transitions to first populate a primary section with content until it is full, then populate a secondary section with content until it is full, and then create an overflow representation to indicate a number of participants to the teleconference session that are not individually represented in either of the primary section or the secondary section. In this way, the viewing user is made aware of a number of other participants in the teleconference session and/or their identities. On the other side, the systems and techniques can follow transitions to first empty the overflow representation, then remove content from the secondary section until it is empty, and then remove content from the primary section until it is empty and the conference session has ended.

Figure 18:
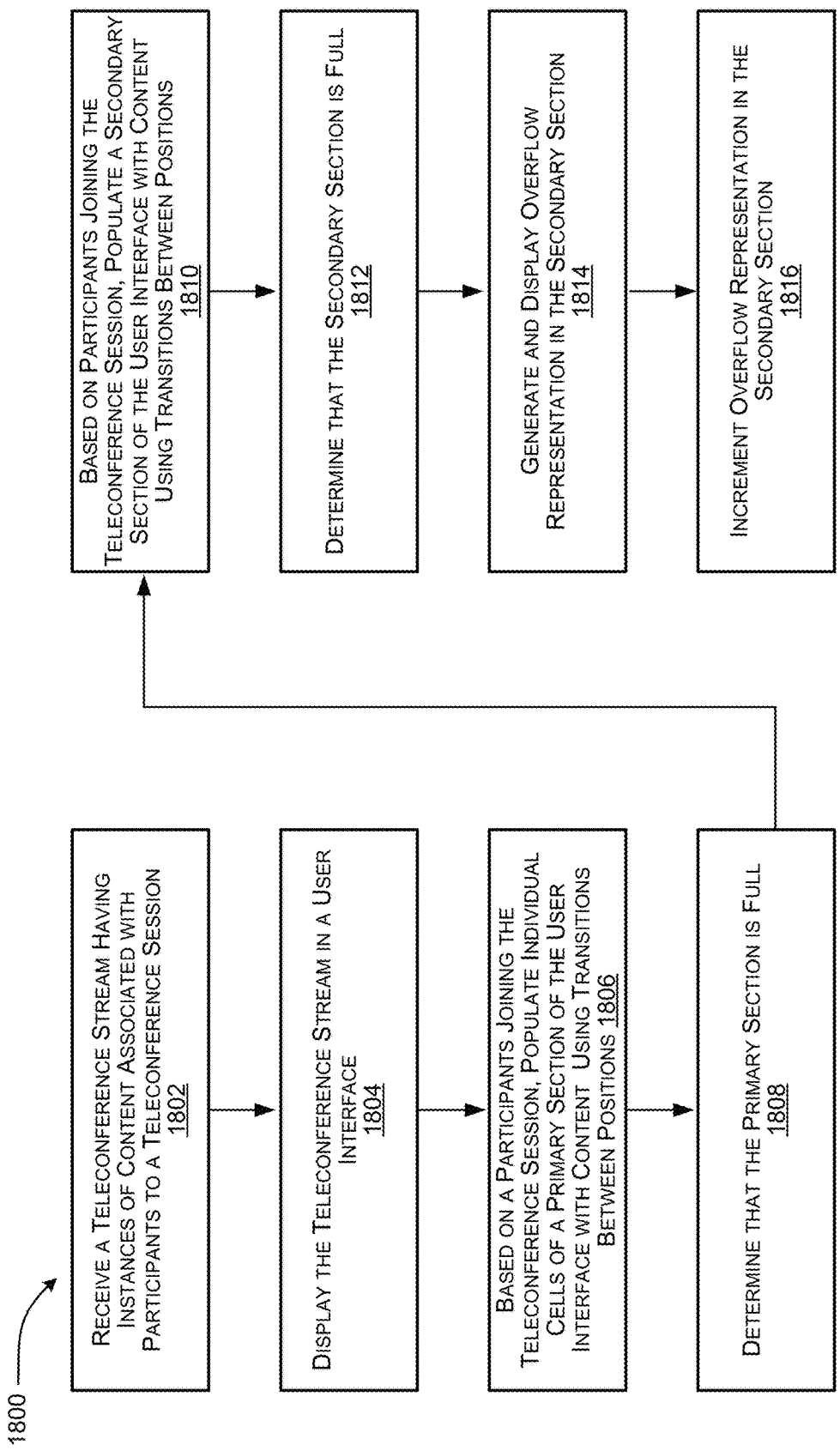
FIG. 18 is a diagram of an example flowchart that illustrates operations directed to populating a primary section and/or a secondary section with instances of content of a teleconference stream.
Figure 19:
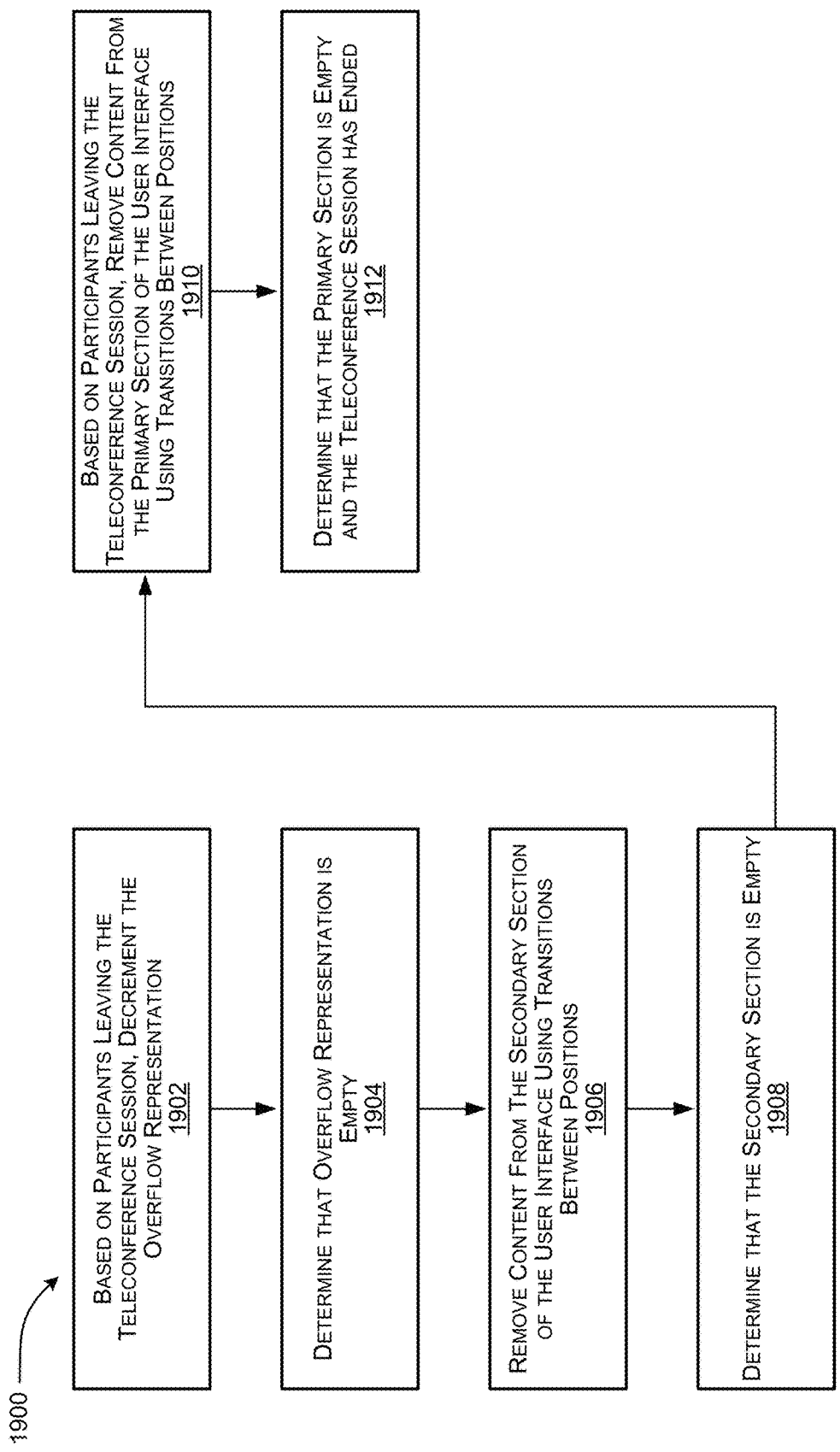
FIG. 19 is a diagram of an example flowchart that illustrates operations directed to removing instances of content of the teleconference stream from the secondary section and/or the primary section.

FIGS. 18 and 19 illustrate example flowcharts of methods for populating a user interface with content (e.g., adding content) when participants join a teleconference session and for removing the content when participants leave the teleconference session. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., a device 110, a device 200, and/or a device 106(1)) and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

FIG. 18 is a diagram of an example flowchart 1800 that illustrates operations directed to populating a primary section and/or a secondary section with instances of content of a teleconference stream. In various implementations, the operations are supported by, or illustrated within, the examples in FIGS. 4A through 17C.

At operation 1802, a teleconference stream having instances of content associated with participants to a teleconference session is received.

At operation 1804, the teleconference stream is displayed in a user interface.

At operation 1806, based on participants joining the teleconference session, individual cells of a primary section of the user interface are added and populated with content. The addition and population of an individual cell comprises transitions between predefined positions.

At operation 1808, it is determined that the primary section is full (e.g., the maximum threshold number of cells or participants has been reached).

At operation 1810, based on additional participants joining the teleconference session, a secondary section of the user interface is populated with content using transitions between positions.

At operation 1812, it is determined that the secondary section is full (e.g., there is no additional display space for an avatar).

At operation 1814, an overflow representation is generated and displayed in the secondary section.

At operation 1816, the overflow representation in the secondary section is incremented based on additional participants joining teleconference session.

FIG. 19 is a diagram of an example flowchart 1900 that illustrates operations directed to removing instances of content of the teleconference stream from the secondary section and/or the primary section. In various implementations, the operations are supported by, or illustrated within, the examples in FIGS. 4A through 17C. Moreover, some operations illustrated in FIG. 19 may be performed during, or in between some, of the operations illustrated in FIG. 18.

At operation 1902, based on participants leaving the teleconference session, the overflow representation in the secondary section is decremented.

At operation 1904, it is determined that the overflow representation is empty and that there are no off-screen participants that need to be represented.

At operation 1906, content is removed from the secondary section of the user interface using transitions between positions.

At operation 1908, it is determined that the secondary section is empty.

At operation 1910, based on for the participants leaving the teleconference session, content is removed from the primary section of the user interface using transitions between positions.

At operation 1912, is determined that the primary section is empty and the teleconference session has ended.

The disclosure presented herein may be considered in view of the following example clauses.

Example Clause A, a system comprising: one or more processing units; and a computer-readable medium having encoded thereon computer-executable instructions to cause the one or more processing units to: receive a teleconference stream having a plurality of instances of content, the teleconference stream indicating that other participants have joined a teleconference session; display the teleconference stream in a user interface, the user interface configured to present a primary section and a secondary section; and populate individual cells of the primary section with individual instances of content, wherein a number of the cells of the primary section populated at a given time corresponds to a number of the other participants that have joined the teleconference session up to a maximum threshold number of other participants that the primary section is configured to accommodate, wherein the populating comprises transitions between positions in the primary section for the individual cells, an individual transition comprising coordinated movement that reduces a size of only one cell currently displayed in the primary section to make room for an incoming cell.

Example Clause B, the system of Example Clause A, wherein the coordinated movement comprises sliding movement that reduces the size of the one cell currently displayed in the primary section by half to make room for the incoming cell.

Example Clause C, the system of Example Clause A or Example Clause B, wherein the populating further comprises: in response to a first other participant joining the teleconference session, displaying a first instance of content associated with the first other participant in a first cell that is displayed in a first position in the primary section; in response to a second other participant joining the teleconference session, transitioning the first cell from the first position to a second position in the primary section to reduce a size of the first cell, and displaying a second instance of content associated with the second other participant in a second cell that is displayed in a third position in the primary section; in response to a third other participant joining the teleconference session, transitioning the second cell from the third position to a fourth position in the primary section to reduce a size of the second cell, and displaying a third instance of content associated with the third other participant in a third cell that is displayed in a fifth position in the primary section, wherein the transitioning the second cell from the third position to the fourth position in the primary section is implemented without reducing a size of the first cell in the second position; and in response to a fourth other participant joining the teleconference session, transitioning the first cell from the second position to a sixth position in the primary section to again reduce the size of the first cell, and displaying a fourth instance of content associated with the fourth other participant in a fourth cell that is displayed in a seventh position in the primary section, wherein the transitioning the first cell from the second position to the sixth position in the primary section is implemented without reducing a size of the second cell in the fourth position in the primary section and without reducing a size of the third cell in the fifth position in the primary section.

Example Clause D, the system of Example Clause C, wherein each of the first position, second position, third position, fourth position, fifth position, sixth position, and seventh position is predefined to minimize an amount of overall movement of content within the user interface as the other participants join the teleconference session.

Example Clause E, the system of Example Clause C or Example Clause D, wherein a new position of an individual cell comprises an area of the user interface associated with a previous position of the individual cell prior to a transition.

Example Clause F, the system of any one of Example Clause A through Example Clause E, wherein the computer-executable instructions further cause the one or more processing units to populate the secondary section with individual additional instances of content associated with additional participants to be added, or that have been added, to the teleconference session after the maximum threshold number of other participants that the primary section is configured to accommodate is reached and the primary section is full.

Example Clause G, the system of Example Clause F, wherein the computer-executable instructions further cause the one or more processing units to: determine that the secondary section is full; generate an overflow representation indicating a number of off-screen participants that are not individually represented in either one of the primary section or the secondary section; display the overflow representation in the secondary section; and increment or decrement the number of off-screen participants based at least in part on an added off-screen participant or a departed off-screen participant, wherein incrementing or decrementing the number of off-screen participants comprises displaying an avatar of the added off-screen participant or the departed off-screen participant within the overflow representation for a predefined period of time.

Example Clause H, the system of Example Clause G, wherein the computer-executable instructions further cause the one or more processing units to display an avatar of a speaking off-screen participant within the overflow representation for the predefined period of time.

Example Clause I, the system of any one of Example Clause A through Example Clause H, wherein an individual instance of content comprises at least one of: live video content of a participant, avatar content associated with a participant, audio content associated with a participant, or digital content displayed on a device of another participant.

While Example Clauses A through I are described above with respect to a system, it is understood in the context of this disclosure that the subject matter of Example Clauses A through I can also be implemented by a device, as a method, and/or via execution of instructions stored on computer storage media.

Example Clause J, a method comprising: receiving, at a client computing device, a teleconference stream; displaying the teleconference stream in a user interface of a display screen associated with the client computing device, the user interface configured to present a primary section and a secondary section; populating cells the primary section of the user interface with instances of content of the teleconference stream as participants join the teleconference session, wherein the populating comprises reducing a size of only one cell currently displayed in the primary section to make room for an incoming cell associated with a participant that joins the teleconference session; determining that the primary section is full and is unable to accommodate additional individual instances of content of the teleconference stream; and based on the determining that the primary section is full, populating the secondary section of the user interface with the additional individual instances of content as additional participants join the teleconference session.

Example Clause K, the method of Example Clause J, wherein determining that the primary section is full comprises determining that an individual number of cells that are configured within the primary section, and that have been populated with the individual instances of content, has reached a maximum threshold number of cells.

Example Clause L, the method of Example Clause J or Example Clause K, wherein at least one instance of content populated in the primary section comprises live video content of a participant and the additional individual instances of content in the secondary section comprise avatars associated with the additional participants.

Example Clause M, the method of any one of Example Clause J through Example Clause L, further comprising: determining that the secondary section is full; based on the determining that the secondary section is full, generating an overflow representation indicating a number of off-screen participants that are not individually represented in either one of the primary section or the secondary section; and displaying the overflow representation in the secondary section, wherein the overflow representation is configured to temporarily display an avatar of a user based on activity performed by the user, the activity comprising one of joining the teleconference session, leaving the teleconference session, or speaking during the teleconference session.

Example Clause N, the method of Example Clause M, further comprising incrementing or decrementing the number of off-screen participants by one based at least in part on an added off-screen participant or a departed off-screen participant.

Example Clause O, the method of any one of Example Clause J through Example Clause N, further comprising: removing the additional individual instances of content from the secondary section as the participants or the additional participants leave the teleconference session; determining that the secondary section is empty and no longer contains an additional individual instance of content; and based on the determining that the secondary section is empty, removing one or more of the individual instances of content or one or more of the additional individual instances of content from the primary section as the participants or the additional participants leave the teleconference session.

Example Clause P, the method of Example Clause O, wherein the removing the additional individual instances of content from the secondary section comprises moving at least one additional individual instance of content from the secondary section to the primary section in response to at least one individual instance of content being removed from the primary section.

Example Clause Q, the method of any one of Example Clause J through Example Clause P, wherein the primary section has larger display area in the user interface than the secondary section.

While Example Clauses J through Q are described above with respect to a method, it is understood in the context of this disclosure that the subject matter of Example Clauses J through Q can also be implemented by a device, by a system, and/or via execution of instructions stored on computer storage media.

Example Clause R, a system comprising: one or more processing units; and a computer-readable medium having encoded thereon computer-executable instructions to cause the one or more processing units to: receive a teleconference stream having a plurality of instances of content, the teleconference stream indicating that participants have joined a teleconference session; display the teleconference stream in a user interface, the user interface configured to present a primary section and a secondary section; receive data indicating that a participant has left the teleconference session; and remove a cell from the primary section based at least in part on the data indicating that the participant has left the teleconference session, the cell containing a first instance of content associated with the participant, wherein the removing the cell comprises a transition in which another cell pushes, via a sliding movement, the cell off of the user interface and the other cell doubles in size by acquiring an area of the user interface vacated by the removed cell.

Example Clause S, the system of Example Clause R, wherein the transition comprises moving the other cell from one predefined position to another predefined position.

Example Clause T, the system of Example Clause R or Example Clause S, wherein removing the cell from the primary section is implemented in response to determining that the secondary section is empty.

While Example Clauses R through T are described above with respect to a system, it is understood in the context of this disclosure that the subject matter of Example Clauses R through T can also be implemented by a device, as a method, and/or via execution of instructions stored on computer storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processing units; and
   a computer-readable medium having encoded thereon computer-executable instructions to cause the one or more processing units to:
   display a communication stream in a user interface of a display screen associated with a client computing device;
   populate cells of the user interface with instances of content of the communication stream as participants join a communication session, wherein a number of the cells that are displayed at a given time corresponds to a number of remote participants that have joined the communication session, the number of remote participants is at least three; and
   for each time a new participant joins the communication session, populate the user interface with an incoming cell by reducing a size of only one cell of the number of the cells to make room for the incoming cell for the new participant while maintaining a size and a position of displayed cells other than the only cell subject to reducing size.

2. The system of claim 1, wherein the number of remote participants is up to a maximum threshold number of remote participants that a primary section of the user interface is configured to accommodate, wherein the user interface is configured to present a primary section that includes the number of the cells and a secondary section, the computer-executable instructions further causing the one or more processing units to:
   determine that the primary section is full and is unable to accommodate additional individual instances of content of the communication stream; and
   based on the determining that the primary section is full, populate the secondary section of the user interface with the additional individual instances of content as additional participants join the communication session.

3. The system of claim 2, wherein the computer-executable instructions further cause the one or more processing units to:
monitor activity in the instances of content and the additional instances of content;
determine that a first amount of monitored activity for a first additional instance of content displayed in the secondary section is greater than a second amount of monitored activity for a second instance of content displayed in the primary section; and
switch, in the user interface, the first additional instance of content with the second instance of content based at least in part on the determining that the first amount of monitored activity for the first additional instance of content displayed in the secondary section is greater than the second amount of monitored activity for the second instance of content displayed in the primary section.

4. The system of claim 3, wherein the activity being monitored comprises movements or sounds that relate to speaking.

5. The system of claim 2, wherein an additional instance of content in the secondary section comprises an avatar and the computer-executable instructions further cause the one or more processing units to:
determine that an event that changes a state of the communication session occurs, the event associated with the additional instance of the content in the secondary section; and
based on determining that the event that changes the state of the communication session occurs, alter a visual appearance of the avatar.

6. The system of claim 5, wherein the event comprises speaking.

7. The system of claim 2, wherein the computer-executable instructions further cause the one or more processing units to:
determine that the secondary section is full;
generate an overflow representation indicating a number of off-screen participants that are not individually represented in either one of the primary section or the secondary section;
display the overflow representation in the secondary section; and
increment or decrement the number of off-screen participants based at least in part on an added off-screen participant or a departed off-screen participant.

8. The system of claim 7, wherein the overflow representation is configured to temporarily display an avatar of a participant based on activity of the participant, the activity comprising one of joining the communication session, leaving the communication session, or speaking during the communication session.

9. The system of claim 1, wherein the reducing the size of the only one cell currently displayed to make room for the incoming cell comprises a sliding, edge to edge, movement in the user interface.

10. The system of claim 1, wherein the computer-executable instructions further cause the one or more processing units to:
determine that one of a document, an image, a spreadsheet, or a slide is to be shared in the communication session; and
based on the determination that the one of the document, the image, the spreadsheet, or the slide is to be shared in the communication session, transition the number of cells to an edge of the user interface.

11. The system of claim 1, wherein reducing the size of the only one cell currently displayed to make room for the incoming cell comprises transitioning the only one cell from one predefined position in the user interface to another predefined position in the user interface.

12. The system of claim 1, wherein the number of remote participants is up to a maximum threshold number of remote participants that a primary section of the user interface is configured to accommodate.

13. A computer-implemented method, comprising:
displaying, at a computing device, a communication stream in a user interface of a display screen in communication with the; and
at the computing device, automatically populating cells of the user interface with instances of content of the communication stream as participants join a communication session, wherein a number of the cells that are displayed at a given time corresponds to a number of remote participants that have joined the communication session up to a maximum threshold number of remote participants, the maximum threshold number of remote participants is at least three; and
for each time a new participant joins the communication session, at the computing device, automatically populating the user interface with an incoming cell by reducing a size of only one cell of the number of the cells to make room for the incoming cell for the new participant while maintaining a size and a position of displayed cells other than the only cell subject to reducing size.

14. The method of claim 13, wherein the user interface is configured to present a primary section that includes the number of the cells and a secondary section, the method further comprising:
determining that the primary section is full and is unable to accommodate additional individual instances of content of the communication stream; and
based on the determining that the primary section is full, populating the secondary section of the user interface with the additional individual instances of content as additional participants join the communication session.

15. The method of claim 14, further comprising:
monitoring activity in the instances of content and the additional instances of content;
determining that a first amount of monitored activity for a first additional instance of content displayed in the secondary section is greater than a second amount of monitored activity for a second instance of content displayed in the primary section; and
switching, in the user interface, the first additional instance of content with the second instance of content based at least in part on the determining that the first amount of monitored activity for the first additional instance of content displayed in the secondary section is greater than the second amount of monitored activity for the second instance of content displayed in the primary section.

16. The method of claim 15, wherein the activity being monitored comprises movements or sounds that relate to speaking.

17. The method of claim 14, wherein an additional instance of content in the secondary section comprises an avatar, the method further comprising:

determining that an event that changes a state of the communication session occurs, the event associated with the additional instance of the content in the secondary section; and based on determining that the event that changes the state of the communication session occurs, altering a visual appearance of the avatar.

18. The method of claim 17, wherein the event comprises speaking.

19. The method of claim 14, further comprising:
determining that the secondary section is full;
generating an overflow representation indicating a number of off-screen participants that are not individually represented in either one of the primary section or the secondary section;
displaying the overflow representation in the secondary section; and
incrementing or decrementing the number of off-screen participants based at least in part on an added off-screen participant or a departed off-screen participant.

20. The method of claim 13, further comprising:
determining that one of a document, an image, a spreadsheet, or a slide is to be shared in the communication session; and
based on the determination that the one of the document, the image, the spreadsheet, or the slide is to be shared in the communication session, transitioning the number of cells to an edge of the user interface.

21. One or more non-transitory computer storage media having encoded thereon computer-executable instructions that, when executed by one or more processing units, cause a system to:
display a communication stream in a user interface of a display screen associated with a client computing device; and
populate cells of the user interface with instances of content of the communication stream as participants join a communication session, wherein a number of the cells that are displayed at a given time corresponds to a number of remote participants that have joined the communication session, the number of remote participants is at least three; and
for each time a new participant joins the communication session, populate the user interface with an incoming cell by reducing a size of only one cell of the number of the cells to make room for the incoming cell for the new participant while maintaining a size and a position of displayed cells other than the only cell subject to reducing size.

22. The one or more computer storage media of claim 21, wherein the number of remote participants is up to a maximum threshold number of remote participants that a primary section of the user interface is configured to accommodate.

* * * * *